United States Patent
Fu et al.

(10) Patent No.: US 11,620,392 B2
(45) Date of Patent: *Apr. 4, 2023

(54) SARGABLE EVALUATION OF QUERIES SUBMITTED TO AN ENCRYPTED DATABASE

(71) Applicant: International Business Machines Corporation, Armonk, NY (US)

(72) Inventors: Xiaohong Fu, Milpitas, CA (US); James W. Pickel, Gilroy, CA (US); Yao Ching Stephen Chen, Saratoga, CA (US); Jeffrey W. Josten, San Jose, CA (US); Nina Bronnikova, Foster City, CA (US); Sarbinder S. Kallar, Santa Clara, CA (US); Shengxi Suo, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 149 days.

This patent is subject to a terminal disclaimer.

(21) Appl. No.: 17/248,806

(22) Filed: Feb. 9, 2021

(65) Prior Publication Data
US 2021/0165892 A1     Jun. 3, 2021

Related U.S. Application Data

(63) Continuation of application No. 16/211,353, filed on Dec. 6, 2018, now Pat. No. 11,042,650.

(51) Int. Cl.
*G06F 21/60* (2013.01)
*G06F 16/245* (2019.01)
*G06F 21/62* (2013.01)

(52) U.S. Cl.
CPC ......... *G06F 21/602* (2013.01); *G06F 16/245* (2019.01); *G06F 21/6218* (2013.01)

(58) Field of Classification Search
CPC .. G06F 21/602; G06F 16/245; G06F 21/6218; G06F 16/24553;
(Continued)

(56) References Cited

U.S. PATENT DOCUMENTS 6,385,608 B1 * 5/2002 Mitsuishi ............... G06F 17/18
707/999.005
6,996,557 B1 * 2/2006 Leung ............... G06F 16/24537
(Continued)

OTHER PUBLICATIONS

Liu et al., "New order-preserving encryption model for outsourced databases in cloud environments" Journal ofNetworkandComputerApplications59(2016) 198-207.
(Continued)

*Primary Examiner* — J. Brant Murphy
(74) *Attorney, Agent, or Firm* — Schmeiser, Olsen & Watts, LLP; Stephanie Carusillo

(57) ABSTRACT

A database-management system provides sargable evaluation for query predicates that compare an "LHS" encrypted database-column operand to an "RHS" expression operand. The system directly compares the two operands if all their attributes match. If the operands are encrypted string-type values differing only in length, the system truncates the RHS or pads it with encrypted blanks and, if a truncation loses meaningful data, evaluates the predicate as never satisfying an equality condition. In all other cases, if all attributes of a plaintext RHS don't match those of the plaintext data encoded into the LHS column, the system attempts to cast the RHS to match the plaintext LHS data. An error condition or data loss at this step allows the system to sargably evaluate the predicate without further analysis, but if the casting is successful and error-free, the system encrypts the resulting RHS and performs a sargable predicate evaluation.

21 Claims, 11 Drawing Sheets

(58) Field of Classification Search
CPC ......... G06F 2221/2107; G06F 21/6227; H04L 9/008; H04L 9/0894
See application file for complete search history.

(56) References Cited

U.S. PATENT DOCUMENTS

| | | | | |
|---|---|---|---|---|
| 7,299,225 | B2* | 11/2007 | Tran | G06F 16/24528 707/999.005 |
| 7,426,752 | B2* | 9/2008 | Agrawal | G06F 21/6227 726/30 |
| 8,812,867 | B2* | 8/2014 | Jho | G06F 21/6227 713/189 |
| 8,930,691 | B2* | 1/2015 | Kamara | H04L 9/00 713/165 |
| 9,037,860 | B1* | 5/2015 | Kerschbaum | H04L 9/14 713/168 |
| 2002/0069193 | A1* | 6/2002 | Beavin | G06F 16/24537 |
| 2004/0103082 | A1* | 5/2004 | Tran | G06F 16/2453 |
| 2004/0117781 | A1* | 6/2004 | Bera | G06F 8/452 717/160 |
| 2005/0147240 | A1* | 7/2005 | Agrawal | G06F 21/60 380/28 |
| 2013/0046974 | A1* | 2/2013 | Kamara | G06F 21/6218 713/165 |
| 2013/0226879 | A1* | 8/2013 | Talukder | G06F 21/6245 707/690 |
| 2017/0344646 | A1* | 11/2017 | Antonopoulos | H04L 63/205 |
| 2020/0184082 | A1 | 6/2020 | Fu | |

OTHER PUBLICATIONS

A. Boldyreva, et al., "Order-preserving symmetric encryption," in Eurocrypt 2009, ser LNCS, A Joux, Ed., vol. 5479. Springer, Heidelberg, Apr. 2009, pp. 224-241.

Boldyreva et al., "Order-preserving encryption revisited: Improved security analysis and alternative solutions." Annual Cryptology Conference. Springer, Bedin, Heidelberg, 2011.

Labriola, Donald J.; List of IBM Patents or Patent Applications Treated as Related; Feb. 8, 2021; 1 page.

Pandey et al.,Property preserving symmetric encryption. Annual International Conference on the Theory and Applications of Cryptographic Techniques. Springer, Berlin, Heidelberg, 2012.

R. Agrawal, et al., "Order Preserving Encryption for Numeric Data", Proceedings of the 2004 ACM SIGMOD International conference on Management of data, Jun. 13-18, 2004, 12 pages.

Raman et al., "DB2 with BLU Acceleration: So Much More than Just a Column Store", Aug. 26-30, 2013, Riva del Garda, Trento, Italy. Proceedings of the VLDB Endowment, vol. 6, No. 11.

* cited by examiner

SARGABLE EVALUATION OF QUERIES SUBMITTED TO AN ENCRYPTED DATABASE

BACKGROUND

The present invention relates in general to database-management system (DBMS) technology and specifically to improved predicate evaluation when querying an encrypted database.

Data stored in a database can be encrypted in order to improve the security of the database. A database query can comprise predicates, which are logical expressions that each resolve to a Boolean TRUE/FALSE value, such as a logical comparison of a literal string or numeric value to data items stored in a column of a table of a database.

A query predicate that can be evaluated in a first stage of a multi-stage DBMS data-access operation and by a component that is physically or logically closer to the DBMS data-storage repository is known in the art as a "sargable" or "stage-1" predicate. Such "early stage" evaluation is much more efficient and less costly than the multiple-access procedures and data-transfer tasks required to evaluate a "non-sargable" (also referred to as a "residual" or "stage-2") predicate.

The expression "INTCOL>123" is an example of a sargable predicate, where INTCOL is a database column of unencrypted (or "plaintext") integer values. Evaluating this predicate comprises retrieving the stored integers and comparing each retrieved integer value to the format-compatible integer value "123." This is also an example of an indexable predicate, as the term is used in the art. If there is a database index defined on the INTCOL column, an index scan may be chosen by the DBMS to scan the index pages to find the appropriate records.

An example of a non-sargable predicate is "(INTCOL1+INTCOL2)>123," where INTCOL1 and INTCOL2 are database columns that each store plaintext integer values. Evaluating this predicate comprises fetching data from the two columns, adding pairs of fetched data items, and then comparing each sum to the literal value "123." This is a non-sargable predicate because all query-evaluation operations cannot be completed at the time of the first data retrieval. Two database accesses are required to perform each pair of fetches and the predicate comparison can be performed only after an additional operation has added the two fetched items.

A predicate that compares operands that have incompatible data types or other incompatible attributes may also be a non-sargable predicate. For example, two stages of processing are needed to evaluate a predicate that compares plaintext values of integer-value column COL1 to a decimal numeric literal like "INTCOL=123.3." In order to prevent errors during the comparison, operands, the DBMS must first convert the operands to compatible data types. A DBMS normally uses a "cast" function to perform such format-conversions. In this example, DBMS systems in general use today would either cast each left-hand-side (LHS) operand COL1 integer to a decimal data type capable of storing the right-hand-side (RHS) numeric operand's 123.3 value, or would cast both the LHS and RHS operands to a common decimal data type. In either case, the resulting data type must have sufficient precision to represent any numeric value capable of being stored in the LHS database column, and to represent the RHS numeric value.

Neither of these procedures can be completed by an early-stage, sargable predicate evaluation. After fetching all data from the stored column, the DBMS must perform additional actions required to cast each fetched integer into a decimal data type, and to then compare the converted data to the RHS value. In other words, it would not be possible to perform an early-stage evaluation in which fetched LHS data is directly compared to a RHS operand without further processing.

In some instances, predicates of this type can be evaluated by an unconventional, but known, sargable procedure in which the DBMS, rather than casting retrieved database data to match a literal operand, instead "casts-down" the literal to a lesser-scope data type that is compatible with the data type of the column of the table. This lets the DBMS directly compare each retrieved column entry directly to the now-compatible cast-down literal, resulting in a single-access early-stage predicate evaluation. This method is not, however, in wide use because casting-down a value to a data type capable of storing a smaller range of data may cause data loss or otherwise alter the value of the cast-down data.

Analogous issues arise when evaluating a query predicate that compares an operand retrieved from an encrypted database to an unencrypted operand. Encrypted (or "ciphertext") fetched data must be decrypted before the data can be compared to an unencrypted value. Therefore, servicing a query to an encrypted database generally requires evaluating high-overhead non-sargable predicates. The procedure becomes even more cumbersome when a pair of operands have different data types, data lengths, CCSID (Coded Character Set ID), and other types of data attributes, requiring an additional cast-up or cast-down operation to be performed upon every fetched data item after the item has decrypted.

These constraints increase overhead when processing queries made against an encrypted database by forcing most predicates to require non-sargable evaluation. They also expose stored data in unencrypted form, sometimes even while being transferred over a network, thus compromising security and privacy benefits that would otherwise be provided by the database's encryption technology.

Some modern encryption technologies, such as order-preserving symmetric encryption (OPE) and homomorphic encryption, in some cases allow encrypted data items to be directly compared and sorted in ciphertext form. However, these relatively new encryption technologies are today limited in scope and none have been adapted to database-encryption technology.

SUMMARY

An embodiment of the present invention provides methods, systems, and computer program products that give a DBMS the ability to sargably evaluate query predicates directed to a database encrypted with OPE (order-preserving symmetric encryption) encryption technology. Such predicates are logical expressions that may be evaluated to either a Boolean TRUE or a Boolean FALSE value. Each predicate contains an operator that compares a left-hand-side ("LHS") operand to a right-hand-side ("RHS") operand, where the LHS operand is an encrypted database column and the RHS is an expression. If all attributes of the LHS and RHS operands match, the system directly compares the two operands in a single sargable evaluation procedure. If the operands are string-type values that differ only in length (implying that the RHS operand, like the LHS operand, must be encrypted), the system matches the operand lengths by either truncating a longer RHS operand or by padding a shorter RHS operand with encrypted blanks. If a truncation operation results in the loss of non-blank RHS data, the DBMS concludes its predicate evaluation with a determination that the predicate can never resolve to a value that deems the RHS operand as being equal to the LHS operand. For example, if the predicate operator is =, then the predicate always evaluates to FALSE and if the predicate operator is < >, the predicate always evaluates to TRUE. If the operands are not string-type values that differ only in length, the system determines whether the RHS operand is encrypted and, if it is encrypted, the system decrypts the RHS operand to plaintext. If any attribute of the plaintext RHS does not match a corresponding attribute of the plaintext data encoded into the LHS database column, the system attempts to cast the RHS to a data format that matches the format of the LHS plaintext values. If the casting fails or generates an error condition, the system determines, as a function of the specific type of failure or error condition, that the predicate will either always evaluate to a TRUE condition or will always evaluate to a FALSE condition. However, if the casting is successful and error-free, the system encrypts the resulting RHS and performs a sargable predicate evaluation.

Another embodiment of the present invention provides methods, systems, and computer program products that give a DBMS the ability to sargably evaluate query predicates directed to a database encrypted with homomorphic encryption technology. Such predicates are logical expressions that may be evaluated to either a Boolean TRUE or a Boolean FALSE value. Each predicate contains an operator that compares a left-hand-side ("LHS") operand to a right-hand-side ("RHS") operand, where the LHS operand is an encrypted database column and the RHS is an expression. If all attributes of the LHS and RHS operands match, the system directly compares the two operands in a single sargable evaluation procedure. If any attribute of the LHS operand does not match corresponding attribute of the RHS operand, the system first determines whether the RHS operand is encrypted and, if determining that the RHS operand is encrypted, decrypts the RHS operand to plaintext. If any attribute of the plaintext RHS does not match corresponding attribute of the plaintext data encoded into the LHS database column, the system attempts to cast the RHS to a data format that matches the format of the LHS plaintext values. If the casting fails or generates an error condition, the system determines, as a function of the specific type of failure or error condition, that the predicate will either always evaluate to a TRUE condition or will always evaluate to a FALSE condition. However, if the casting is successful and error-free, the system encrypts the resulting RHS and performs a sargable predicate evaluation.

DETAILED DESCRIPTION

Figure 1:
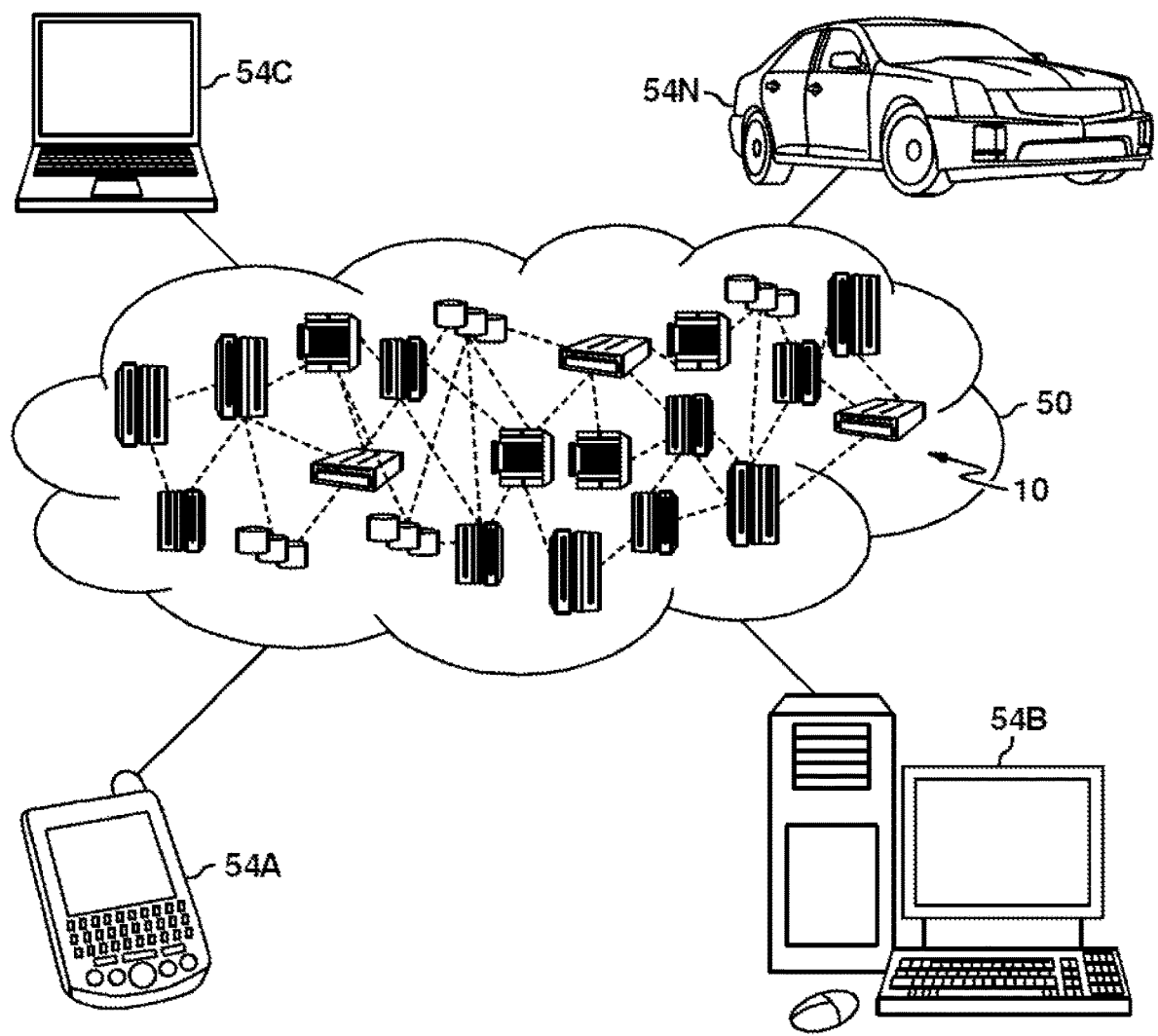
FIG. 1 depicts a cloud computing environment according to an embodiment of the present invention.

A database query may contain one or more logical expressions (or "predicates") that are each evaluated to a TRUE or FALSE condition for each piece of data retrieved when the query is evaluated. For example, the predicate:

Address.State< >"NY"

returns a TRUE value if a data item retrieved from column "State" of database table "Address" contains a string value that is not equal to the two-character string value "NY." If the retrieved value is equal to "NY," this predicate evaluates to FALSE.

Similarly, a query that comprises the predicate:

T1.C3>25 returns a TRUE value if a numeric data item retrieved from column C3 of table T1 is greater than the numeric value 25. If a retrieved value is equal to or less than the value 25, the predicate is FALSE.

Although not described in this document for pedagogical reasons, query predicates may be more complex than these simple examples, sometimes incorporating multiple levels of table lookups, nested predicates, complex numeric and string expressions, and numerous operators and operands.

This document refers to query predicates with the notation:

LHS op RHS, where "LHS" refers to a left-hand side operand of the predicate, "op" is an operator, and "RHS" identifies a right-hand side operand. For example, in the first example above, "Address.State" would be an LHS, the operator "< >" would be the op, and "NY" is the RHS. Similarly, in the second example, LHS="T1.C3," op=">," and RHS="25."

If queried data is stored in an encrypted format, each retrieved data item must generally be decrypted in order to evaluate the predicate. In the first example, each data item retrieved from column "State" by this query must be decrypted in order to compare value of the retrieved data item to the unencrypted value "NY."

The need to decrypt the value of an encrypted column into "plaintext" form before the predicate can be evaluated can significantly delay predicate evaluation and negatively affect index selection, and this is a disadvantage of encrypted-database technology. The decryption/encryption process requires a significant amount of overhead. Furthermore, exposing encrypted ciphertext as unencrypted plaintext while a query is being evaluated can compromise database security.

Embodiments of the present invention improve upon known database-encryption technology with an improved method of executing queries upon encrypted databases. This improved method includes methods, systems, and computer program products that evaluate predicates without requiring retrieved data items to be decrypted. In some cases, there is no way to avoid at least one decryption procedure when evaluating a predicate, but even in such cases, embodiments allow a predicate to be evaluated as a higher-performance "indexable" or "sargable" predicate (sometimes referred to as a "stage-1" predicate because the predicate is capable of being evaluated during the first stage of query processing, often with great efficiency by a local data manager or index manager).

One class of embodiments is capable of being applied to databases encrypted with any type of deterministic encryption technology, including AES (Advanced Encryption Standard) encryption with different encryption modes such as ECB mode or CBC mode, or homomorphic encryption. These embodiments may, however, be used to facilitate the evaluation of predicates that comprise only certain operands or operators. Other embodiments may be applied to a broader range of query-predicate operands if a database has been encrypted with order-preserving symmetric encryption (OPE).

OPE is a known encryption technology, but it is not known to be used to encrypt the content of databases. One useful aspect of OPE encryption is that OPE encryption preserves the order of plaintext data items when those items are encrypted into a ciphertext. For example, using OPE to encrypt a list of ten usernames that are in alphabetic order produces ten encrypted data items that, despite consisting of completely different alphanumeric characters, remain in the same alphabetic order. Similarly, when applied to a database, using OPE to encrypt a column of plaintext data elements sorted by a particular index produces a set of encrypted elements that remain in the same indexed order.

OPE is also symmetric and deterministic, such that repeatedly encrypting and decrypting a data element using the same key and initialization (or "seed") vector will always produce results the same ciphertext and plaintext values.

OPE-compliant embodiments of the present invention comprise applying OPE to encrypt the contents of a database. Although a nonstandard application, OPE is known to possess characteristics that would allow this encryption technology to work especially well with modern databases. These characteristics include:

The results of query processing over data encrypted using OPE are deterministic and exact. Embodiments of the present invention that apply OPE to existing database technology neither generate false positives nor fail to return a qualifying result.

OPE can be easily integrated with existing database systems because OPE is expressly designed to operate efficiently with hierarchical indexing structures such as the B-trees used by relational databases.

OPE allows implementers to customize the relative lengths of an unencrypted plaintext data element and its equivalent OPE-encrypted ciphertext, so long as the plaintext length is less than the ciphertext length.

Another advantage that OPE provides over other encryption technologies is that, after performing an OPE encryption and decryption operation upon a sorted set of data elements, resorting the results using the index that was defined on the encrypted column or the same sort method does not alter the sequence of the set. In other words, OPE preserves the order of data elements stored in encrypted databases so that query predicates, indices, aggregating functions like MAX and MIN, set operations like UNION, EXCEPT, and INTERSECT, grouping operations like GROUP BY, and ordering operations like ORDER BY can be applied to a database column of encrypted data without requiring that data to be decrypted.

This property of OPE provides OPE-encrypted databases with significant technical advantages over databases encrypted by other encryption technologies. For example, OPE allows certain query predicates to be evaluated without first decrypting retrieved data because encrypting a plaintext operand into ciphertext allows that operand to be directly compared to OPE-encrypted column values retrieved from the database. This allows the DBMS to service queries without the computational overhead or security compromises incurred by decryption operations required by other types of database encryption.

OPE further improves known types of database encryption by allowing indexable encrypted database content to be sorted and searched without decryption. As described above, sorting a database index or column of OPE-encrypted data elements orders those elements into the same sequence into which they would have been ordered had they not been encrypted.

These advantages can improve database performance by making certain otherwise-non-sargable (also known as "residual") predicates sargable, resulting in "early stage" sargable evaluation capable of providing an enormous increase in performance. For example, if a predicate compares a literal value to non-OPE encrypted stored data, a query comprising that predicate may require two stages of processing: i) retrieving and decrypting every stored element of a database column of ciphertext; and ii) evaluating the predicate against each decrypted data element of that column.

Figure 6:
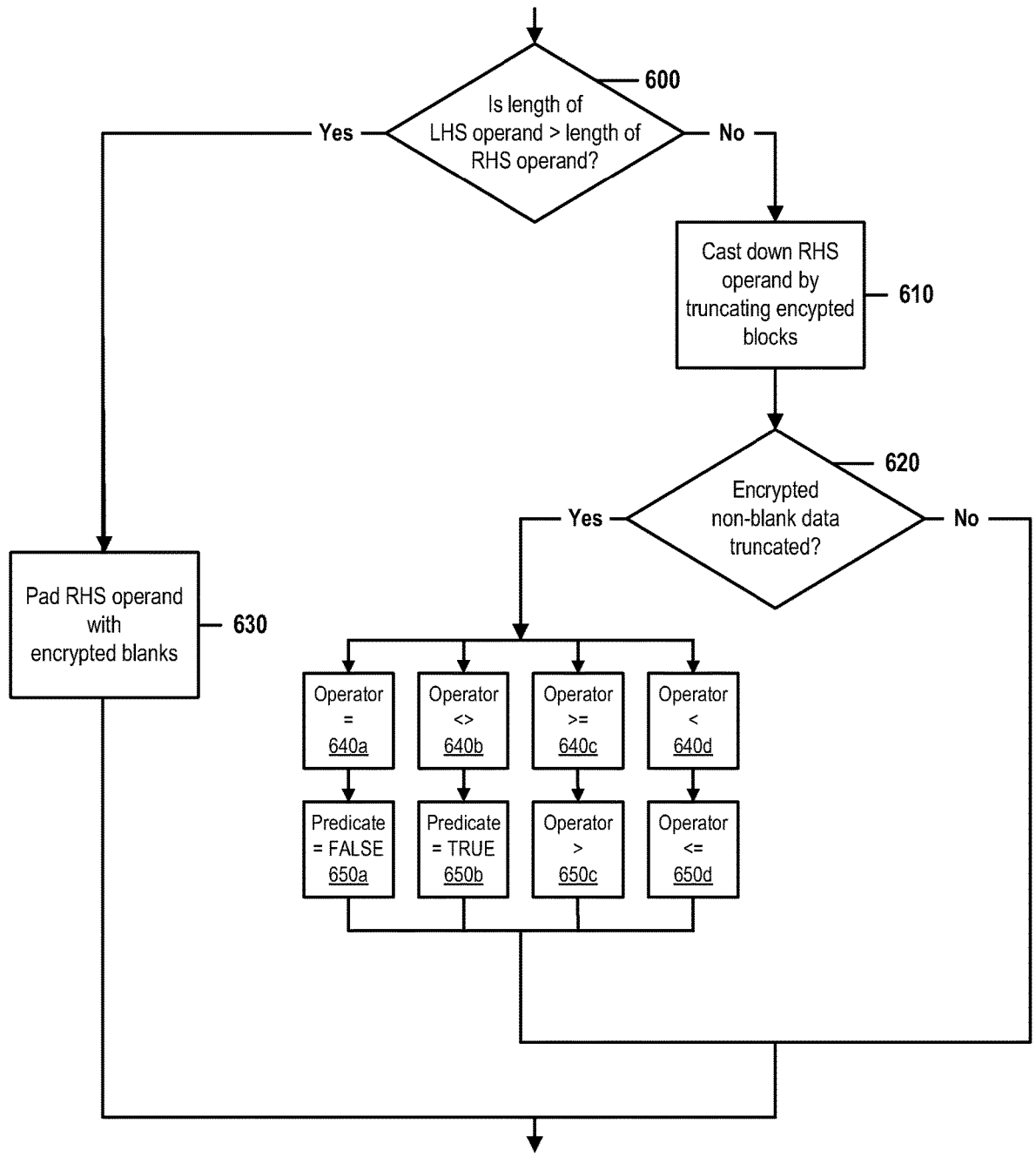
FIG. 6 is a flow chart that shows details of FIG. 5, step 540, which reconciles length differences between string-type LHS and RHS predicate operands of a received query.
Figure 8:
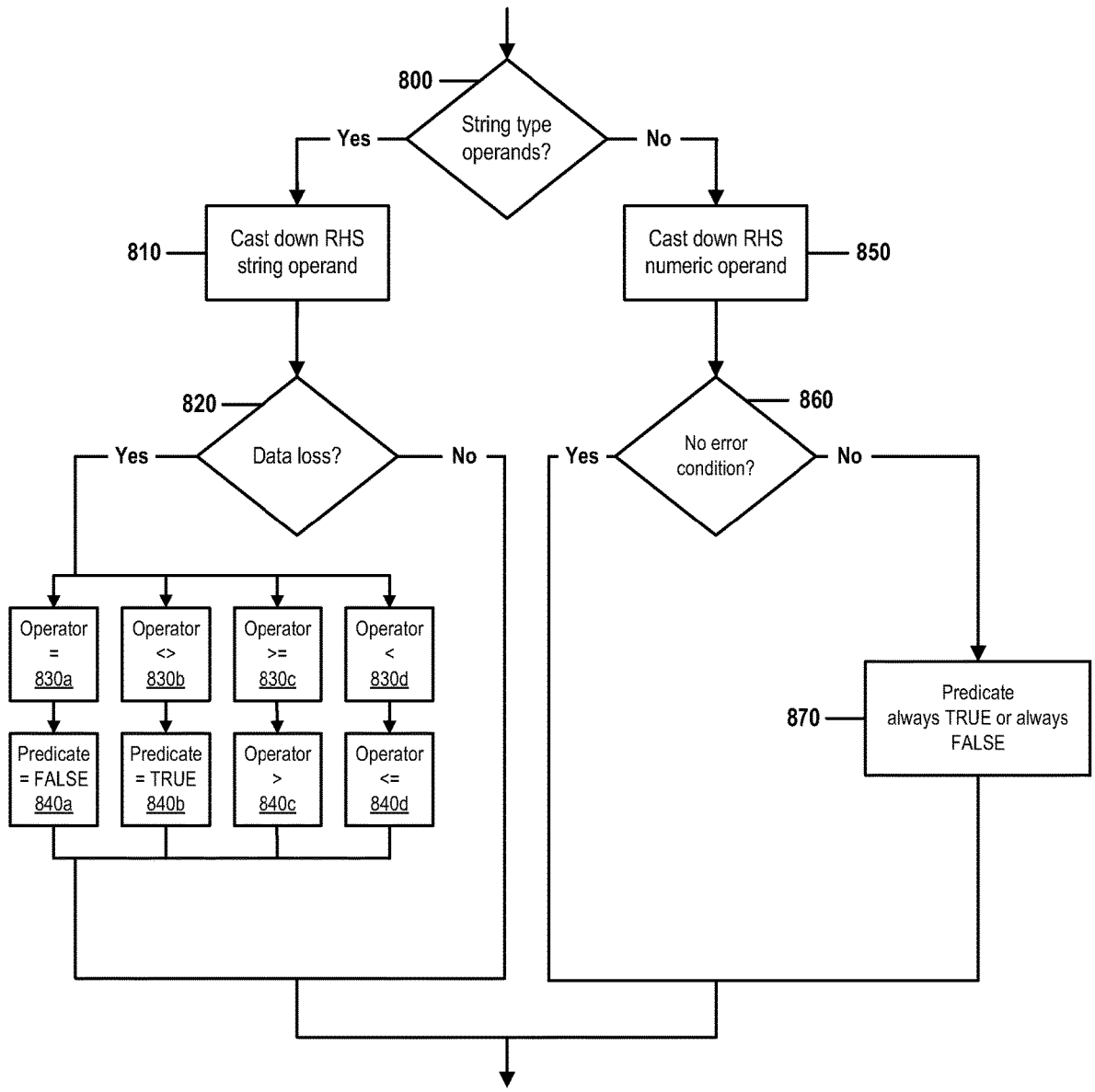
FIG. 8 is a flow chart that shows details of FIG. 7, step 760, which casts down a plaintext RHS operand in order to reconcile attributes of the RHS operand with those of plaintext values encoded into the encrypted column of the database table identified by the LHS operand.

Embodiments may provide even greater advantages by exploiting characteristics of OPE-encrypted data to infer that certain predicates must always yield a TRUE result or must always yield a FALSE result when receiving certain ciphertext data values. As shown in FIGS. 6 and 8, these inferences may be made by merely identifying the results of certain truncation or casting operations performed upon undecrypted ciphertext values.

Even an OPE-encrypted database cannot evaluate certain predicates with only one stage of processing, directly performing one encryption/decryption operation (encrypting the predicate literal) and then comparing the resulting ciphertext literal to each stored encrypted value. When a query predicate compares a stored column of ciphertext to a second predicate operand, embodiments can directly compare stored ciphertext to the second operand if both the column and the second operand have identical attributes (such as coded character set identifier (CCSID), data type or subtype, and data length) and have been encrypted using the same OPE algorithm and encryption key and initialization vector (IV). This procedure is described in FIG. 4.

In real-world implementations, a predicate may compare operands, including operands that comprise encrypted stored database data, that have different data types, subtypes, data lengths, or CCSIDs. In such cases, embodiments can perform steps described in FIGS. 5-8 to reconcile the two operands through padding and truncating procedures. This allows the predicate to be evaluated as a sargable predicate despite format and type differences between its operands.

Certain embodiments of the present invention extend this inventive concept to databases encrypted with non-OPE encryption technologies, such as AES CBC, AES ECB, or homomorphic encryption. Although still capable of providing significant performance and security improvements to these database technologies, these embodiments may be limited to predicates that comprise different types of operands and operators.

As described below, embodiments and examples presented in this document generally describe only an exemplary subset of all possible database implementations, query predicates, and predicate operands. These simplifications are made for purposes of clarity and should not be construed to limit embodiments to only these examples.

This document generally represents predicates in the formats:

$$<OPE\_col><op><exp> \quad (1)$$

or $$<exp><op><OPE\_col>, \quad (2)$$

where
<OPE_col> represents a predicate operand that identifies a database column encrypted with OPE;
<op> represents a comparison operator. In embodiments described in the examples of this document that comprise deterministic order-preserving encryption technologies like OPE and homomorphic encryption, <op> may represent at least any direct-comparison predicate operator supported by a DBMS or query language, such as: =, < >, >, >=, <, and <=. Some embodiments, including those that comprise a different type of encryption technology, may process predicates that comprise additional or different <op> operators that are known in the art to be derivable from combinations of the above direct-comparison operators, such as BETWEEN, NOT BETWEEN, IN, NOT IN, IS DISTINCT FROM, and IS NOT DISTINCT FROM. For example, the predicate
EncCol IS DISTINCT FROM "91029"
is equivalent to the compound predicate:
EncCol< >"91029" OR EncCol IS NULL
<exp> represents a predicate operand that consists of a mathematical or data expression containing arguments like a database column. For example, <exp> <expression> can comprise a combination of constants, host variables, SQL variables, encrypted or unencrypted columns, and other arguments known in the art of database query construction.

In examples and embodiments presented in this document, these predicate formats are subject to certain, pedagogical constraints:
An expression <exp> cannot identify a database column that is in the same table as column <OPE_col>.
When evaluating a predicate, the DBMS must access any database table comprising a column identified by <expression> before accessing the database table comprising column <OPE_col>. In DBMS parlance, the table containing <OPE_col> is referred to as the "inner table."

Although embodiments of the present invention may evaluate either of the above predicate formats with equal efficiency, examples described in this document arbitrarily comprise the first of the two above formats, arranging <OPE_col> operands on the left-hand-side (LHS) of a predicate and <exp> predicates to the right-hand-side (RHS).

Because NULL data values are not encrypted by OPE, examples and embodiments described in this document do not discuss retrieving NULL values when evaluating a predicate and do not discuss IS NULL and IS NOT NULL <op> operators.

In theory, OPE can be applied to any string or numeric data type, but embodiments and examples described in this document do not reference <OPE_col> operands that identify columns that store encrypted decimal floating-point data types like the common DECFLOAT data type. Such encrypted inner columns are not included because predicate operands that identify DECFLOAT operands always require a non-sargable evaluation, even when querying an unencrypted database. Although embodiments of the present invention could be implemented on such predicates, they would provide no performance benefit. Despite this constraint on the LHS <OPE_col> operand, embodiments of the present invention can still provide performance benefits when evaluating an <exp> operand that includes non-encrypted DECFLOAT columns or that returns DECFLOAT results.

Although OPE, as mentioned above, is capable of adjusting the relative lengths of encrypted and unencrypted data, examples cited in this document describe OPE algorithms that encrypt each 4-byte block of plaintext to 16 bytes of data formatted into a 128-bit unsigned binary integer. If an unencrypted data element does not consist of a number of bytes that is evenly divisible by four, then the final 1-3 bytes of data are encrypted to a 16-byte block that has been padded with encrypted blank characters. This convention should not be construed to limit embodiments of the present invention to such data-element lengths or padding operations, neither of which are intrinsic to OPE technology. Although certain of the encrypted-data padding and casting functions described in the figures are unique to the present invention, embodiments may comprise encryption schemes that generate any other valid combination of relative plaintext and ciphertext lengths.

Embodiments use this length-adjusting methodology to allow a DBMS system to compare heterogeneous ciphertext variables without requiring an extra decryption step. As shown in FIGS. 5-8, the system may pad a shorter data element or truncate a longer data element in order to reconcile the lengths of two different-length elements before comparing them. These padding and truncating procedures allow an embodiment to cast encrypted predicate operands into compatible forms that allow the DBMS to evaluate the predicate as a sargable early stage evaluation.

In one example, an OPE algorithm pads plaintext string variables as necessary with encrypted "blank" padding characters that have the hexadecimal value "20." This step is necessary to ensure that only full four-byte blocks of plaintext data are encrypted into 16-byte blocks of ciphertext. A plaintext four-character, four-byte CHAR(4)-data type string value "ABCD" would not require such padding because the string is already the correct length to be encrypted to one 16-byte block of ciphertext. However, a plaintext two-character, two-byte CHAR(2)-data type string value "AB" must first be padded with two blank characters to extend the length of the string to four bytes. If "AB" is represented by the hex value "C1C2," then the resulting four-byte hexadecimal representation of string "AB" would be "C1C22020." This four-byte padded string could then be encrypted to one 16-byte block of ciphertext.

As will be explained in the below figures, this restructuring of decrypted data allows direct comparisons of otherwise heterogeneous encrypted and decrypted operands. For example, consider a predicate:

T1C1="AB"

where T1C1 is a database column that contains encrypted four-character string values. If an embodiment simply encrypted the value "AB" and then used other steps of the present invention to compare that encrypted value to the encrypted strings stored in T1C1, the predicate would always evaluate to FALSE because the stored four-character strings would never be equal to a two-character encrypted operand. By using the above technique to cast the operand "AB" to a four-character string prior to encryption, embodiments are able to properly compare two operands that are formatted in congruent 16-byte ciphertext.

Casting operations may be used to reconcile numeric data types or string types that differ not only in length, but that also differ in other attributes, such as data type, encryption key, or encryption IV. In one example, a predicate compares a two-byte SMALLINT-type integer plaintext operand to a 32-byte encrypted form of an eight-byte BIGINT-type integer value retrieved from a database column. Here, the system would reconcile differences between the two-byte literal plaintext and the two 16-byte blocks of ciphertext by casting the SMALLINT value into the same length as that of the BIGINT value. For example, a SMALLINT value of 1 stored in an internal storage format as the hexadecimal value 8001 would be converted to a BIGINT value 1 stored in an internal storage format as the hexadecimal value 8000000000000001. This conversion would entail converting the SMALLINT value to an eight-byte BIGINT storage format and then encrypting the two four-byte BIGINT blocks into two 16-byte blocks of ciphertext. The resulting two 32-byte encrypted data elements could then be compared and further processed by methods of FIGS. 5-8.

This example should not be construed to limit embodiments of the present invention to only one type of integer storage-format conversion. The present invention is flexible enough to accommodate embodiments comprising any sort of known data format, endianness convention, or other implementation-specific method of representing stored data.

When determining whether a first operand must be cast into a different format in order to compare it to a second operand, the character encoding or "CCSID" (Coded Character Set Identifier) of each operand must be considered in order to select a correct blank padding character. For example, the UTF-8 (CCSID 1208) encoding scheme encodes a blank character as a hexadecimal "20" value. So an operand encoded in UTF-8 can only be padded with hex 20 bytes. But an operand encoded according to the CCSID 836 encoding scheme would be padded with bytes that each contain the CCSID 836 X40 representation of a blank character.

The present invention can accommodate any encoding scheme, so long as an embodiment consistently represents data in a manner that complies with a particular encoding standard.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
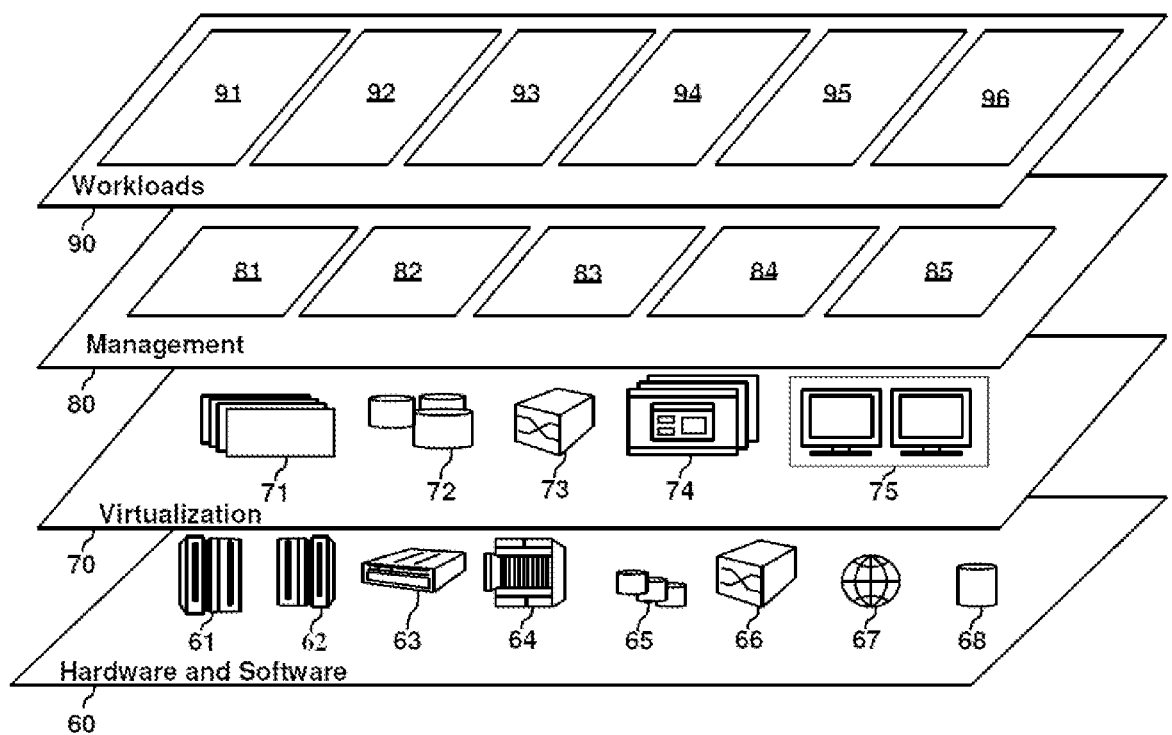
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex database-management functionality that includes sargable query-predicate evaluation for encrypted databases.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
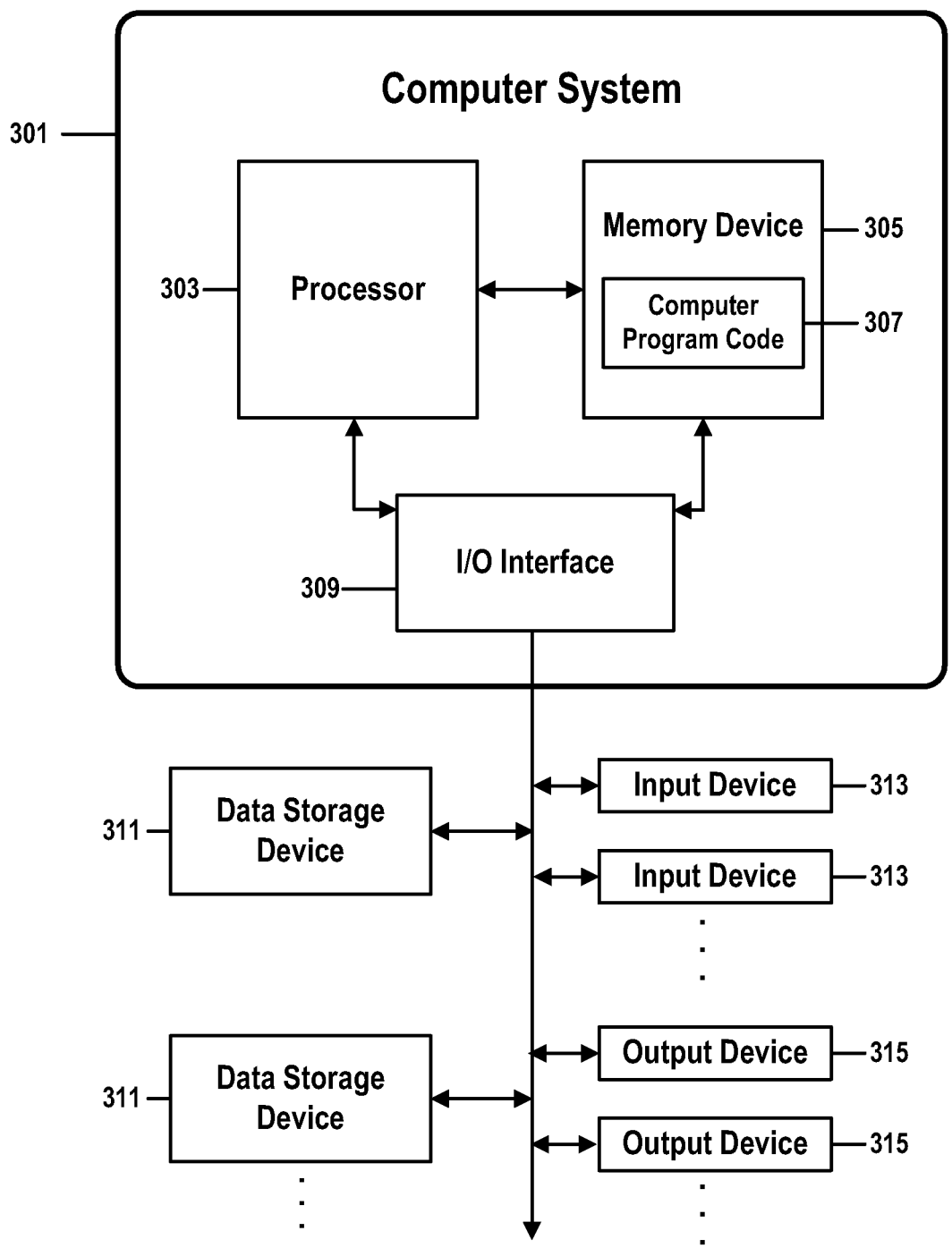
FIG. 3 shows the structure of a computer system and computer program code that may be used to implement a method for sargable query-predicate evaluation for encrypted databases in accordance with embodiments of the present invention.

FIG. 3 shows a structure of a computer system and computer program code that may be used to implement a method for sargable query-predicate evaluation for encrypted databases in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for sargable query-predicate evaluation for encrypted databases in accordance with embodiments of the present invention, and may implement other embodiments described in this specification, including the methods illustrated in FIGS. 1-11. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for sargable query-predicate evaluation for encrypted databases.

Any of the components of the present invention could be created, integrated, hosted, maintained, deployed, managed, serviced, supported, etc. by a service provider who offers to facilitate a method for sargable query-predicate evaluation for encrypted databases. Thus the present invention discloses a process for deploying or integrating computing infrastructure, comprising integrating computer-readable code into the computer system 301, wherein the code in combination with the computer system 301 is capable of performing a method for sargable query-predicate evaluation for encrypted databases.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for sargable query-predicate evaluation for encrypted databases may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for sargable query-predicate evaluation for encrypted databases is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
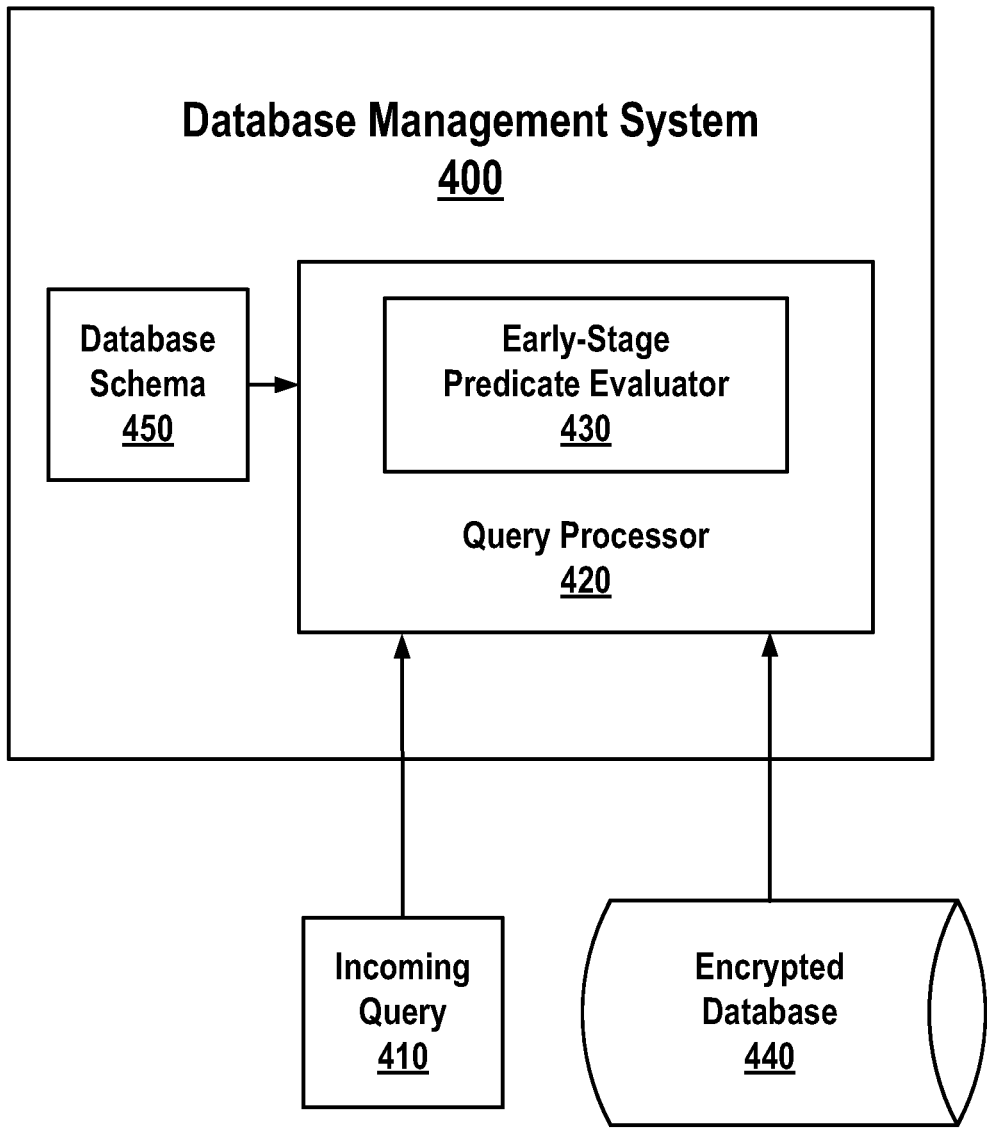
FIG. 4 shows the structure of a database management system 400 that performs sargable query-predicate evaluation for encrypted databases in accordance with embodiments of the present invention.

FIG. 4 shows the structure of a database management system 400 that performs sargable query-predicate evaluation for encrypted databases in accordance with embodiments of the present invention. FIG. 4 shows items 400-450.

DBMS 400 comprises numerous modules, including: a query processor 420 that receives, evaluates, and responds to incoming queries 410; an early-stage predicate evaluator module 430 that evaluates query predicates that comprise encrypted operands such that the predicates may be evaluated without requiring non-essential data-decryption tasks; and a database schema 450 that represents the topology of encrypted database 440, including logical relationships between tables, indexes, and other characteristics of the database 440, including information about the encryption scheme used to encrypt data stored in database 440.

In some embodiments, certain of these elements may be organized slightly differently. For example, information about encryption algorithms, keys, and initialization vectors may be stored in a distinct data repository, rather than in schema 450, and some embodiments may require the query processor 420 to supervise the overall task of evaluating query predicates, calling upon the early-stage predicate evaluator 430 only to perform specific encryption-related evaluation subtasks described in subsequent figures. Predicate evaluator 430 may be implemented as a component of query processor 420 or may be a distinct DBMS module that is internal to DBMS 400 but external to the query processor 420.

In general, embodiments of the present invention improve known DBMS technology for managing encrypted databases 440 by adding to a DBMS 400 the early-stage predicate evaluator module 430. This module 430 improves DBMS 400 by performing methods for evaluating predicate operands that identify encrypted data similar to those described in the figures below.

Figure 5:
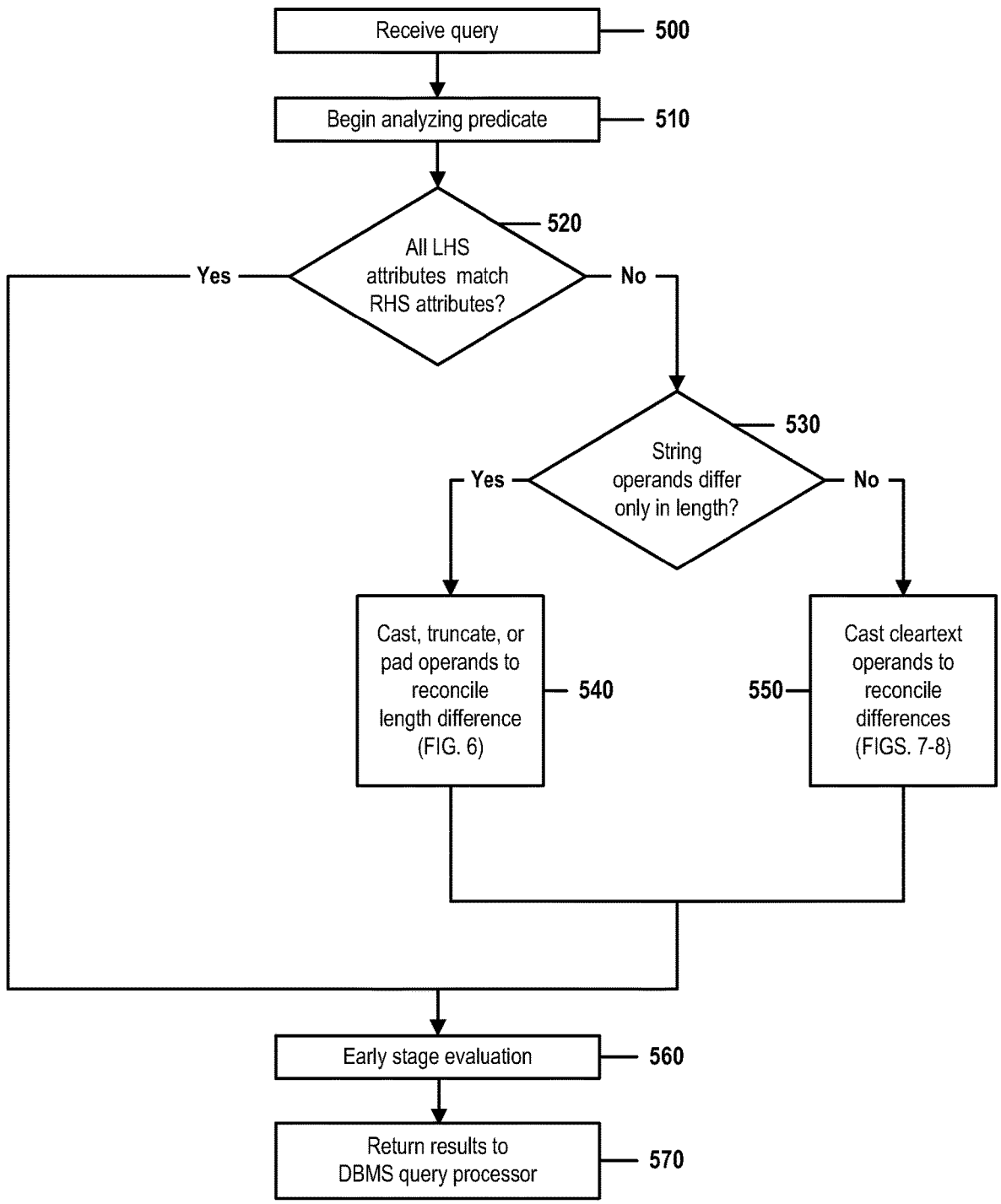
FIG. 5 is a high-level representation of the method for early-stage query evaluation for OPE-encrypted databases, details of which are shown in FIGS. 6-8.
Figure 7:
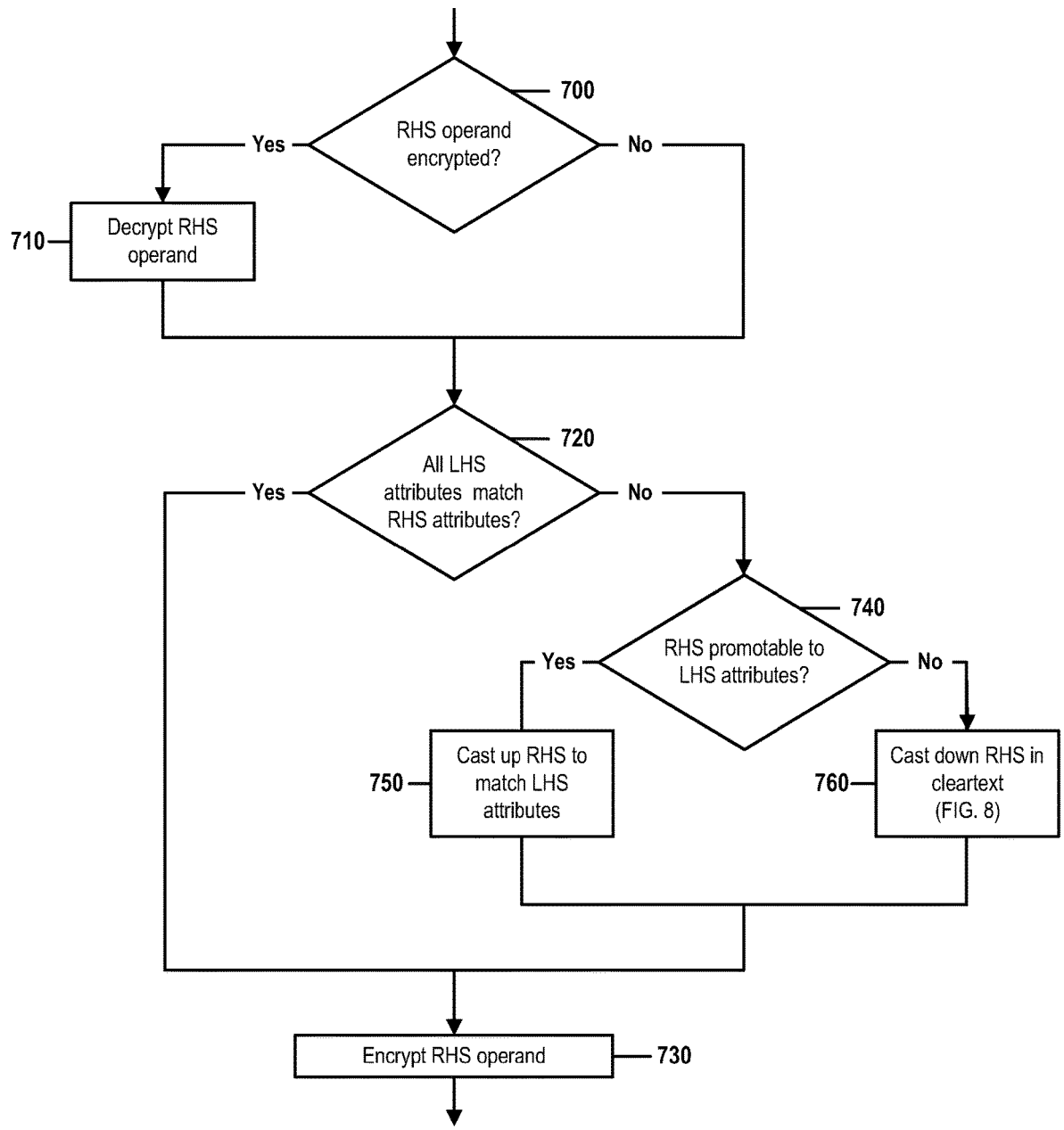
FIG. 7 is a flow chart that shows details of FIG. 5, step 550, which reconciles attribute differences between plaintext LHS and RHS predicate operands of a received query.

FIG. 5 is a high-level representation of the method for early-stage query evaluation for OPE-encrypted databases, details of which are shown in FIGS. 6-8. FIG. 5 contains steps 500-570, which may be implemented on platforms similar to those of FIGS. 1-4.

In step 500, query processor 420 of DBMS 400 receives a database query 410, which contains at least one predicate that references encrypted data stored in encrypted database 440. Although embodiments of the present invention are not limited to databases encrypted with any particular type of encryption technology, the exemplary database 440 shown in FIG. 5 is encrypted with an OPE (order-preserving symmetric encryption) algorithm.

In step 510, query processor module 420 forwards a predicate of the received query 410 to the early-stage predicate evaluator 430 module of DBMS 400. In some embodiments, query processor module 420 forwards the entire query 410 to the early-stage predicate evaluator module 430, which then extracts a predicate from the forwarded query 410.

The evaluator module 430 in this step identifies a left-hand-side operand (LHS) of the predicate, a right-hand-side operand (RHS) of the predicate, and an operator (<op>) of the predicate that compares the LHS to the RHS. The predicate may take any form that may be processed by the particular DBMS 400 and querying technology, but as described above, for FIGS. 5-8 will for pedagogical purposes describe only exemplary predicates in the previously discussed form of Eq. (1):

$$<OPE\_col><op><exp> \quad (1)$$

$$<exp><op><OPE\_col>, \quad (2)$$

where LHS <OPE_col> is an OPE-encrypted column of database 440, RHS <exp> is a mathematical, or data expression that does not identify a column stored in the same table that comprises <OPE_col>, and <op> is a comparison operator =, < >, >, <, >=, or <=. Embodiments of the present invention may process other predicate forms, such as the form of Eq. (2) above, by methods analogous to those of the examples of FIGS. 5-8.

RHS operand <exp> may be either plaintext or encrypted ciphertext and may be either a local predicate (which does not identify a database column) or a JOIN predicate that does identify a database column.

The OPE-encrypted column of the LHS operand will be evaluated as a column of an inner table that is accessed only after RHS operand is evaluated. Because one goal of the present invention is to evaluate predicates without requiring two-stage processing, methods described in this figure exclude predicates that must be evaluated as non-sargable predicates. These include predicates in which a second stage of processing would be necessary to evaluate the LHS operand even if no operands of the predicate had been encrypted.

In step 520, module 430 determines whether all attributes of the LHS operand match attributes of data elements identified by the RHS operand. These attributes may include any attributes known in the art of database management, including CCSID (for data types like CHAR, VARCHAR, GRAPHIC, and VARGRAPHIC), data type, data subtype (for data types like CHAR and VARCHAR), and data length (such as CHAR length for string data types or precision and scale for DECIMAL data types). Because the LHS operand identifies an OPE-encrypted column, module 430 in this step also determines whether the RHS expression is also encrypted, using the same OPE algorithm and key and IV.

For example, in a predicate "CustomerResidence_State >"NY"", LHS operand <OPE_col> identifies a database CustomerResidence_State column that contains four-byte CHAR(4) data items encoded with the UTF-8 Unicode character-encoding standard; and RHS operand <exp> is a two-character string literal. Because the lengths of the two operands are not equal, and because the RHS literal value "NY" is not encrypted, module 430 in this step would determine that not all attributes match and continue with steps 530-550, which incorporate the methods of FIGS. 6-8. If all attributes do match, the method of FIG. 5 instead proceeds directly to step 560, where the predicate undergoes early-stage evaluation, as described below.

In step 530, evaluator module 430 determines whether the LHS and RHS operands are both encrypted string data items and whether the only difference between attributes of the two operands is a difference in length. In some embodiments minor differences in data type or subtype are acceptable so long those differences do not produce different bit representations of a data value. For example, such embodiments might not deem CHAR and VARCHAR types to be different or might not deem GRAPHIC and VARGRAPHIC types to be different for purposes the comparison performed in this step.

If evaluator module 430 deems that the LHS and RHS operands are string values that differ only in length, then the method of FIG. 4 continues with step 540 and FIG. 6. At the conclusion of the method of FIG. 6, the length differences between the two operands will have been resolved and the method of FIG. 5 continues with step 560.

If evaluator module 430 deems that the LHS and RHS operands are not string values that differ only in length, then the method of FIG. 4 continues with step 550 and FIGS. 7-8.

At the conclusion of the methods of FIGS. 7-8, any other differences between the two operands will have been resolved and the method of FIG. 5 continues with step 560.

In step 560, evaluator module 430 concludes the evaluation of the predicate as a sargable, early stage operation. This is possible because one of the following conditions have occurred:

i) In step 520, module 430 determined that the LHS and RHS are OPE-encrypted operands that share identical attributes. Given the order-preserving properties of OPE, this allows the two encrypted operands to be compared without requiring a decryption step. So long as the operands are not of a type that would require a multiple-stage evaluation even if not encrypted, the predicate requires only an early-stage evaluation, in which the two operands can be directly compared byte by byte, as ciphertext, in a single operation.

ii) In step 540 and FIG. 6, evaluator module 430 reconciles the length difference between the LHS and RHS string-type operands, either returning two OPE-encrypted string values that share identical attributes (as in condition i)), or determining from the result of the reconciliation attempt that the predicate can be evaluated to only a certain default Boolean value. In either case, the predicate does not require a second stage of evaluation.

iii) In step 550 and FIG. 7, evaluator module 430 reconciles differences between the LHS and RHS operands (including cases in which the RHS operand is not encrypted), either returning two encrypted values that share identical attributes, or determining from the result of the reconciliation attempt that the predicate can only resolve to a certain default Boolean value.

In step 570, early-stage predicate evaluator returns the results of its predicate evaluation to DBMS query processor 420. The query processor 420 incorporates these results into the ongoing evaluation of the incoming query 410 received in step 500. Query processor 420 then completes its processing of query 410 through means known in the art, directing other modules of DBMS 400 to perform tasks known in the art to be required to perform the query.

FIG. 6 is a flow chart that shows details of FIG. 5, step 540, which reconciles length differences between string-type LHS and RHS predicate operands of received query 410. FIG. 6 contains steps 600-650d.

Embodiments use the method of FIG. 6 to reconcile length differences between string operands because this method allows the resulting operands to be directly compared without requiring either security-compromising decryption steps or performance-lowering non-sargable predicate-evaluation operation.

In one example of a method of reconciling different-length strings that does not provide these advantages, consider two exemplary predicates that both comprise LHS operand <enc-col> that identifies a database column storing encrypted CHAR(3) string-type data:

<enc-col> < "ABCDEF"
and
<enc-col> < "AB"

The first predicate compares this LHS operand to the RHS plaintext CHAR(6) string-type operand "ABCDEF" and the second predicate compares the LHS operand to the RHS plaintext CHAR(2) string-type operand "AB."

One method of performing this comparison would comprise:

i) retrieving and decrypting values stored in the LHS operand column ii) promoting the first predicate's LHS operand's retrieved values from CHAR(3) to CHAR(6) and promoting the second predicate's RHS operand from CHAR(2) to CHAR (3) in order to reconcile the operand length differences in each predicate to the greater of each predicate's operand lengths. This procedure compromises data security by exposing the LHS data in plaintext form throughout the duration of the predicate evaluation procedure. The procedure also requires an inefficient non-sargable evaluation that requires, for every value stored in the LHS-operand column, first retrieving and decrypting the LHS value and then comparing that value to the RHS operand.

The alternative method of FIGS. 6-8 described below provide an improved method of evaluating such different-length string-type predicates without requiring a stored database column to be decrypted and without requiring a non-sargable predicate evaluation.

In step 600, evaluator module 430 begins evaluating the LHS and RHS operands identified by steps 530 and 540 of FIG. 5. These operands identify string-type data that differs in format only in length.

In this step, evaluator module 430 determines whether the length of the LHS OPE-encrypted string-type operand is greater than the length of the RHS OPE-encrypted string-type operand. If the LHS is greater, then the method of FIG. 6 concludes with step 630. If the RHS is greater, then the method of FIG. 6 concludes with steps 610-650d. The LHS and RHS operands cannot be the same length because same-length string operands are not processed by steps 530 and 540 of FIG. 5.

In step 630, having determined that the LHS operand has greater length than the RHS operand, evaluator module 430 reconciles the two lengths by promoting the RHS to the same length as the LHS operand.

As described above, this promotion is performed by padding the RHS operand with encrypted blank characters. If, for example, the LHS operand comprises two 16-byte encrypted blocks and the RHS operand comprises one 16-byte encrypted block, then the evaluator module 430 in this step pads the RHS operand with an additional 16-byte block of encrypted blank characters.

Depending on platform and software requirements, this padding may be performed by adding blank characters to the right of the rightmost byte of each operand, by adding blank characters to the left of the leftmost byte of each operand, or by any other means known in the art. The present invention may accommodate any padding pattern that complies with data-storage conventions used by the computing platform on which the DBMS 400 runs.

Similarly, if the RHS operand comprises one 16-byte encrypted block and a partial 8-byte block, then the evaluator module 430 in this step pads the partial block with eight bytes of encrypted blank characters. This second example is included for illustrative purposes despite the fact that a partial encrypted block would not be possible in embodiments where the OPE algorithm used to encrypt the LHS and RHS algorithms can encrypt data only into full 16-byte blocks.

At the conclusion of step 630, the LHS and RHS operands will have been reconciled into identical formats, with matching attributes that include data type, length, encryption algorithm, and encryption key and IV. When returned to step 560 of FIG. 5, it will be possible to evaluate the resulting predicate with a single, sargable operation that directly compares the encrypted values of the two operands.

In step 610, having determined that the RHS operand has greater length than the LHS operand, evaluator module 430 reconciles the two lengths by casting down the data format of the RHS operand to match the attributes of the encrypted string values stored in the database column identified by the LHS operand. This casting down is performed by truncating encrypted blocks of data from the RHS operand, until the RHS operand has the same length as the LHS operand.

In step 620, evaluator module 430 determines whether this truncation alters the plaintext value that is represented by the ciphertext of the truncated RHS operand. That is, if only blank padding characters are truncated from the RHS operand, the unencrypted value represented by the encrypted operand is not altered. However, if the truncation deletes blocks of data that contain non-blank encrypted characters, the casting-down will have altered the value encoded into the RHS operand.

In one example, consider a predicate where the LHS operand identifies a database column containing encrypted values that each consist of one four-byte encrypted block, and where the RHS operand consists of two four-byte encrypted blocks. In step 610, the evaluator module 430 casts down the RHS operand to the length of the LHS operand by truncating one four-byte block. If the evaluator module 430 in step 620 determines that the deleted block contains only encrypted blank characters, then evaluator module 430 assumes that the original value encoded into the RHS operand has not been altered by the truncation. If, however, the evaluator module 430 in step 620 determines that the deleted block contains encrypted non-blank characters, then evaluator module 430 assumes that the RHS operand no longer contains an encrypted version of the original value.

In all these steps, evaluator module 430 is able to identify the specific OPE algorithm and key and IV, the CCSID of each operand data element, and the bit value representation of an encrypted blank character generated by the OPE algorithm for each possible CCSID. This information may be supplied by the DBMS 400, may be stored with the database schema 450, or may be made available to the evaluator module 430 by any other means known in the art of DBMS design.

If evaluator module 430 determines in step 620 that the value originally encoded into the RHS operand has been altered by the truncation operation of step 610, the evaluator module 430 performs steps of the case statement 640a-650d. Here, satisfying any of the conditions 640a-640d results in the performance of the corresponding action 650a-650d. In these steps, conditions 640a-640d are functions of the operator <op> comprised by the predicate currently being evaluated. If none of the conditions identified by conditions 640a-640d occur (for example, if the predicate operator <op> is <=(less than or equal to)), then the case statement 640a-650d performs no action.

Case 640a/650a states that if the operator is an equality (=) operator, then the predicate must resolve to a FALSE Boolean value. This occurs because the two operands, in their original encrypted forms, cannot be equal. The LHS operand represents an unencoded value that can be represented as a certain number of encrypted blocks, but the RHS operand represents an unencoded value that can only be represented by a greater number of encrypted blocks. When returning control to step 560 of FIG. 5, this determination allows the predicate to be resolved without further computation, thus ensuring a sargable evaluation procedure. In some embodiments, the FALSE determination of step 650a would be sufficient to complete the predicate-evaluation procedure.

Case 640b/650b states that if the operator is an inequality (< >) operator, then the predicate must resolve to a TRUE Boolean value. This occurs because the two operands, as explained above, cannot be equal. When returning control to step 560 of FIG. 5, this determination allows the predicate to be resolved without further computation, thus ensuring a sargable evaluation procedure. In some embodiments, the TRUE determination of step 650b would be sufficient to complete the predicate-evaluation procedure.

Case 640c/650c states that if the operator is a greater-than-or-equal-to (>=) operator, then that operator must be replaced with a greater-than (>) operator. This ensures that further evaluation of the predicate in FIG. 5, step 560 does not resolve the predicate to a TRUE Boolean value if the truncated RHS operand is equal to the LHS operand. As mentioned in step 620, it is known that the LHS and RHS operands cannot be equal, even if truncating the RHS produces a subset of the original RHS operand that now matches the original LHS operand. For example, although a LHS operand "ABCD" should not be found to be equal to a RHS operand "ABCDEFGH," the LHS operand is nonetheless equal to a length-matching "ABCD" truncation of RHS operand. For this reason, the equality comparison case is deleted from the predicate operator in this step to avoid a false-positive determination that the original LHS and RHS operands are equal. When returning control to step 560 of FIG. 5, this determination allows the two format-matched encrypted predicates to be directly compared by means of a sargable evaluation procedure.

Similarly, case 640d/650d states that if the operator is a less-than (<) operator, then that operator must be replaced with a less-than-or-equal-to (<=) operator. This ensures that further evaluation of the predicate in FIG. 5, step 560 resolves the predicate to a TRUE Boolean value if the truncated RHS operand is equal to the LHS operand. For example, although a LHS operand "ABCD" is less than a RHS operand "ABCDEFGH," truncating the RHS operand to a value of "ABCD" results in the LHS operand being equal to, no less than, the truncated RHS operand. For this reason, the equality comparison case is added to the predicate operator in this step in order to ensure that the predicate resolves to a TRUE value in such a case. Because it is known that the two operands do not represent equal values in their original nontruncated forms, this substitution cannot affect the evaluation of cases in which a predicate compares two identical operands. When returning control to step 560 of FIG. 5, this determination allows the two format-matched encrypted predicates to be directly compared by means of a sargable evaluation procedure.

If the predicate operator is not one of {=, < >, >=, <}, then the method of FIG. 6 returns control to FIG. 5 step 560.

FIG. 7 is a flow chart that shows details of FIG. 5, step 550, which reconciles attribute differences between plaintext LHS and RHS predicate operands of received query 410. FIG. 7 contains steps 700-760.

In step 700, evaluator module 430 begins evaluating the LHS and RHS operands identified by steps 530 and 550 of FIG. 5. These operands comprise data elements with data types other than string types that differ in format only in length. Although the LHS operand identifies an OPE-encrypted column of database 400, the RHS operand may or may not be encrypted. If the RHS is encrypted, however, it may be encrypted with the same OPE algorithm, key, and seed or IV with which the LHS column is encrypted.

In this step, evaluator module 430 determines whether the RHS operand is encrypted. If so, the method of FIG. 7 performs step 710, in which the RHS operand is decrypted. As described above, evaluator module 430 identifies information required to perform this decryption, such as identifications of the appropriate OPE encryption algorithm, key, and seed or IV. This algorithm, key, and seed or IV may not match those used to encrypt the LHS operand column, but they must match the algorithm, key, and seed or IV used to originally encrypt the RHS operand. At the conclusion of steps 700 and 710, the RHS operand is known to be an unencrypted plaintext value.

In step 720, evaluator module 430 determines whether all attributes of the plaintext data items stored in encrypted form in the <OPE_col> column of the LHS operand match corresponding attributes of the plaintext RHS. The evaluator module 430 is able to identify the plaintext LHS attributes through known means because those attributes are identified by the database schema 450 of DBMS 400 or by other components of DBMS 400.

In one example, an embodiment compares a set of attributes of the plaintext data items that have been encrypted and stored in the LHS database column with corresponding attributes of the plaintext RHS operand. If evaluating numeric-type operands, evaluator module 430 might compare attributes that include data type, precision, scale, and byte length of each operand. If evaluating string-type operands, evaluator module 430 might compare attributes that include data type, length, subtype, and CCSID. The exact choice of attributes to compare may be determined by an implementer as a function of technical constraints or of industry standards or conventions.

If evaluator module 430 determines in step 720 that all plaintext attributes of the LHS operand match corresponding attributes of the plaintext RHS operand, then the method of FIG. 7 concludes with step 730. Otherwise, the method of FIG. 7 continues with steps 740-760.

In step 740, evaluator module 430, having determined that the plaintext values represented by the LHS and RHS operands do not have identical attributes, determines whether it is possible to promote the RHS operand, without loss of data, to a type and format comprising attributes that match the attributes of plaintext data values represented by the LHS operand. These attributes, depending on implementation details or design constraints, may include attributes like data type, data subtype, length, precision, CCSID, or scale.

For example, if the RHS operand is a two-byte signed integer value and the LHS operand identifies a database table that stores encrypted values of four-byte signed integers, it is possible to cast the RHS operand to the four-byte data type of the LHS operand, since the four-byte LHS data type can represent any signed integer value that can be stored in two bytes.

However, if the RHS operand is a five-byte string value, the evaluator module 430 would determine in step 740 that it is not possible to promote the RHS-operand value to the LHS-operand's two-byte string format. This is because a two-byte string column cannot store a five-character string.

In step 750, having determined that the RHS plaintext value is promotable to the data format of the plaintext values represented by the ciphertext values stored in the LHS-operand database column, evaluator module 430 casts the RHS value to a data format (including a data type and length) that matches the format of the LHS plaintext.

In step 760, having determined that the RHS plaintext value is not promotable to the data format of the LHS plaintext values, evaluator module 430 transfers control to the method of FIG. 8, which casts down the RHS value in plaintext such that the predicate may be evaluated through an early stage procedure.

At the conclusion of the affirmative branch of conditional step 720, or at the conclusion of step 750 or 760, one of three conditions will be true: i) the RHS operand will have been converted to a plaintext value with attributes that match those of the plaintext values encoded into the database column identified by the LHS operand; ii) the evaluator module 430 will have determined that, regardless of the values of retrieved LHS-operand data items, the predicate must always evaluate to a TRUE value; or iii) the evaluator module 430 will have determined that, regardless of the values of retrieved LHS-operand data items, the predicate must always evaluate to a FALSE value. In all these cases, evaluator module 430 then encrypts the RHS operand in step 730 and returns control to step 560 or 570 of FIG. 5.

The RHS operand is encrypted in step 730 with the same OPE algorithm, key, and seed or IV that is used to encrypt the LHS operand. If the RHS operand had originally been encrypted with a different OPE algorithm, key, or seed/IV, the new ciphertext value of the RHS operand may not match the original ciphertext value of the RHS operand. However, at the conclusion of step 730 (in all cases except those where evaluator module 430 has already determined that the predicate can only be TRUE or can only be FALSE), the LHS and RHS operands will have identical attributes and will both consist of ciphertext encrypted with the same OPE algorithm, key, and seed or IV.

At the conclusion of the method of FIG. 7, no more than a handful of encryption or decryption operations will have been performed on the predicate operands. The potentially large number of encrypted data elements of RHS-operand database column do not need to be decrypted and, at the conclusion of FIG. 7, the evaluator module 430 returns control to FIG. 5, step 560, where the predicate, if it has not already been determined to be TRUE or FALSE, can be evaluated through an early-stage evaluation procedure that directly compares two OPE-encrypted data elements that have identical attributes.

FIG. 8 is a flow chart that shows details of FIG. 7, step 760, which casts down a plaintext RHS operand in order to reconcile attributes of the RHS operand with those of plaintext values encoded into the encrypted column of the database table identified by the LHS operand. FIG. 8 contains steps 800-870.

In step 800, evaluator module 430 determines whether the LHS operand and the RHS operand received from step 760 of FIG. 7 identify string-type data. As described in FIG. 7, the RHS operand consists of a plaintext expression and the LHS operand identifies a column of an inner database table that contains ciphertext encryptions of plaintext values. The comparison of step 800 compares the data type of the RHS plaintext expression with the data type of the plaintext values encoded into the LHS column.

If evaluator module 430 determines that the operands contain string-type data, then the method of FIG. 8 continues with steps 810-840d. If not, the method of FIG. 8 continues with steps 850-870.

In step 810, evaluator module 430 casts down the RHS string operand to the length, data type, and data subtype of the LHS plaintext string values. In these steps, the RHS-operand string length must be greater than the length of the LHS plaintext format.

The casting down of this step is performed by known means, such as by truncating the RHS such that the length of the RHS operand matches that of the plaintext values represented by the encrypted LHS column.

In step 820, evaluator module 430 determines whether this truncation results in the loss of data from the RHS plaintext operand. If not, the method of FIG. 8 concludes and the reconciled plaintext RHS operand is returned to the method of FIG. 7, where the operand is encrypted to a format comprising attributes that match those of the encrypted data stored in the LHS column. This encrypted RHS operand may be compared directly to encrypted values retrieved from the table in an early stage predicate evaluation procedure.

If, however, evaluator module 430 determines in step 820 that the truncation of the RHS operand has resulted in the deletion of non-blank characters, thus resulting in data loss, the evaluator module 430 performs steps of the case statement 830a-840d. Here, satisfying any of the conditions 830a-830d results in the performance of a corresponding action 840a-840d. In these steps, conditions 830a-830d are functions of the operator <op> comprised by the predicate currently being evaluated. If none of the conditions identified by conditions 830a-830d occur (for example, if the predicate operator <op> is > (greater than)), then the case statement 830a-840d performs no action.

Case 830a/840a states that if the operator is an equality (=) operator, then the predicate must resolve to a FALSE Boolean value. This occurs because the two operands cannot be equal due to data loss caused by truncation of the RHS operand. When returning control to step 760 of FIG. 7, and then to step 560 of FIG. 5, this determination allows the predicate to be resolved without further computation, thus ensuring a sargable evaluation procedure. In some embodiments, the FALSE determination of step 830a would be sufficient to complete the predicate-evaluation procedure.

Case 830b/840b states that if the operator is an inequality (< >) operator, then the predicate must resolve to a TRUE Boolean value. This occurs because the two operands, as explained above, cannot be equal. When returning control to step 760 of FIG. 7 and step 560 of FIG. 5, this determination allows the predicate to be resolved without further computation, thus ensuring a sargable evaluation procedure. In some embodiments, the TRUE determination of step 840b would be sufficient to complete the predicate-evaluation procedure.

Case 830c/840c states that if the operator is a greater-than-or-equal-to (>=) operator, then that operator must be replaced with a greater-than (>) operator. This ensures that further evaluation of the predicate in FIGS. 5 and 7 does not resolve the predicate to a TRUE Boolean value if the truncated RHS operand is equal to the LHS operand. Because the LHS and RHS operands cannot be equal, even if truncating the RHS produces a subset of the original RHS operand that now matches the original LHS operand, the predicate should still resolve to a FALSE Boolean value. For this reason, the equality comparison case is deleted from the predicate operator in this step to avoid a false-positive determination that the original LHS and RHS operands are equal. When returning control to step 760 of FIG. 7 and then to step 560 of FIG. 5, this determination allows the two format-matched encrypted operands to be directly compared by means of a sargable evaluation procedure.

Similarly, case 830d/840d states that if the operator is a less-than (<) operator, then that operator must be replaced with a less-than-or-equal-to (<=) operator. As in the case statement branch 640d/650d, this ensures that further evaluation of the predicate in FIGS. 5 and 7 resolves the predicate to a TRUE Boolean value if the truncated RHS operand is equal to the LHS operand. When returning control to step 760 of FIG. 7 and then to step 560 of FIG. 7, this determination allows the two format-matched encrypted operands to be directly compared by means of a sargable evaluation procedure.

If the predicate operator <op> is not one of {=, < >, >=, <}, then the method of FIG. 8 returns control to FIG. 7 step 760.

In step 850, having determined that the predicate compares a pair of numeric operands, evaluator module 430, through methods and technologies known in the field of database management and computer programming, attempts to cast down the RHS numeric operand to the length, data type, precision, and scale of the plaintext numeric values represented by the encrypted LHS column.

In step 860, evaluator module 430 determines whether the cast-down attempt of step 850 failed due to a data overflow, underflow, or precision-loss and may round up and round down the cast operation's input value when loss of precision occurs. During the round-up or round-down, overflow and underflow may also occur. These errors are caused by irreconcilable differences between the formats of the LHS and RHS operands or rounding errors that occur during the casting down. The failures may be determined as functions of the RHS operand's plaintext value and the data type of the LHS column, regardless of individual data values that might be stored in the LHS column.

As used in this document, the term "cast down" refers to a CAST operation that forces a data element from a first data type and length to a second data type and length that is capable of representing a smaller range of values than the first data type. For example, a CHAR(6) string-type variable, which is capable of storing six-character strings, might be cast down to a CHAR(3) string, which is capable of storing strings no longer than three characters. Similarly, an INT numeric type variable, which is capable of storing a four-byte integer value, might be cast down to a SMALL-INT numeric type, which can only store integer values that may be represented by two bytes of data. A cast-down function is the opposite of a cast-up operation, as the terms are used in this document. Here, casting up refers to a CAST operation that forces the data type and length of a data element to a type and length that is capable of representing a larger range of values.

For example, if the LHS operand of predicate "OPE_col>34022.3333" identifies a database column defined with a DECIMAL(2,1) data type, an attempt to cast down the RHS operand to match the LHS data type, precision, and scale must fail because the value 34022.3333 cannot be represented as DECIMAL(2,1) type data. In other words, attempts to downcast a RHS operand that has 5 significant digits before the decimal point to a data type that has precision 2 scale 1 fails due to an irreconcilable precision mismatch.

If the cast-down attempt is successful, including the successful roundings during the cast-down, the method of FIG. 8 concludes with step 860 and the successfully cast-down plaintext numeric RHS operand is returned to step 760 of FIG. 7. This cast-down RHS can then be encrypted in step 730 of FIG. 7 and directly compared to the encrypted LHS operand by the method of FIG. 5, requiring only a sargable evaluation procedure.

Even a casting failure or error condition can produce useful information. The precision mismatch may indicate that the predicate must evaluate to a FALSE value because the LHS can never represent a value greater than the RHS. For similar reasons, the predicate "OPE_col<34022.3333"

(where OPE_col is of type DECIMAL(2,1)) must always evaluate to a TRUE value and the predicate "OPE_col=34022.3333" must always be FALSE because no DECIMAL(2,1) value can be greater than or equal to the decimal value 34022.3333.

Similarly, if the LHS operand identifies data that has a SMALLINT data type, attempting to downcast the RHS of predicate "OPE_col>=32768.88" (where OPE_col has a SMALLINT data type) produces a data overflow failure because the largest value that may be stored as SMALLINT data is 32767. As in the first example, this predicate will always evaluate to a FALSE value because the LHS can never represent a value greater than or equal to the RHS.

In step 870, evaluator module 430 determines, as a function of the predicate characteristics described above, that the predicate either must always evaluate to a TRUE value or must always evaluate to a FALSE condition. The method of FIG. 8 then returns to FIG. 7, step 760, and in some embodiments, the identification of an always-TRUE or an always-FALSE condition is sufficient to complete the predicate-evaluation procedure without requiring further steps.

Figure 9:
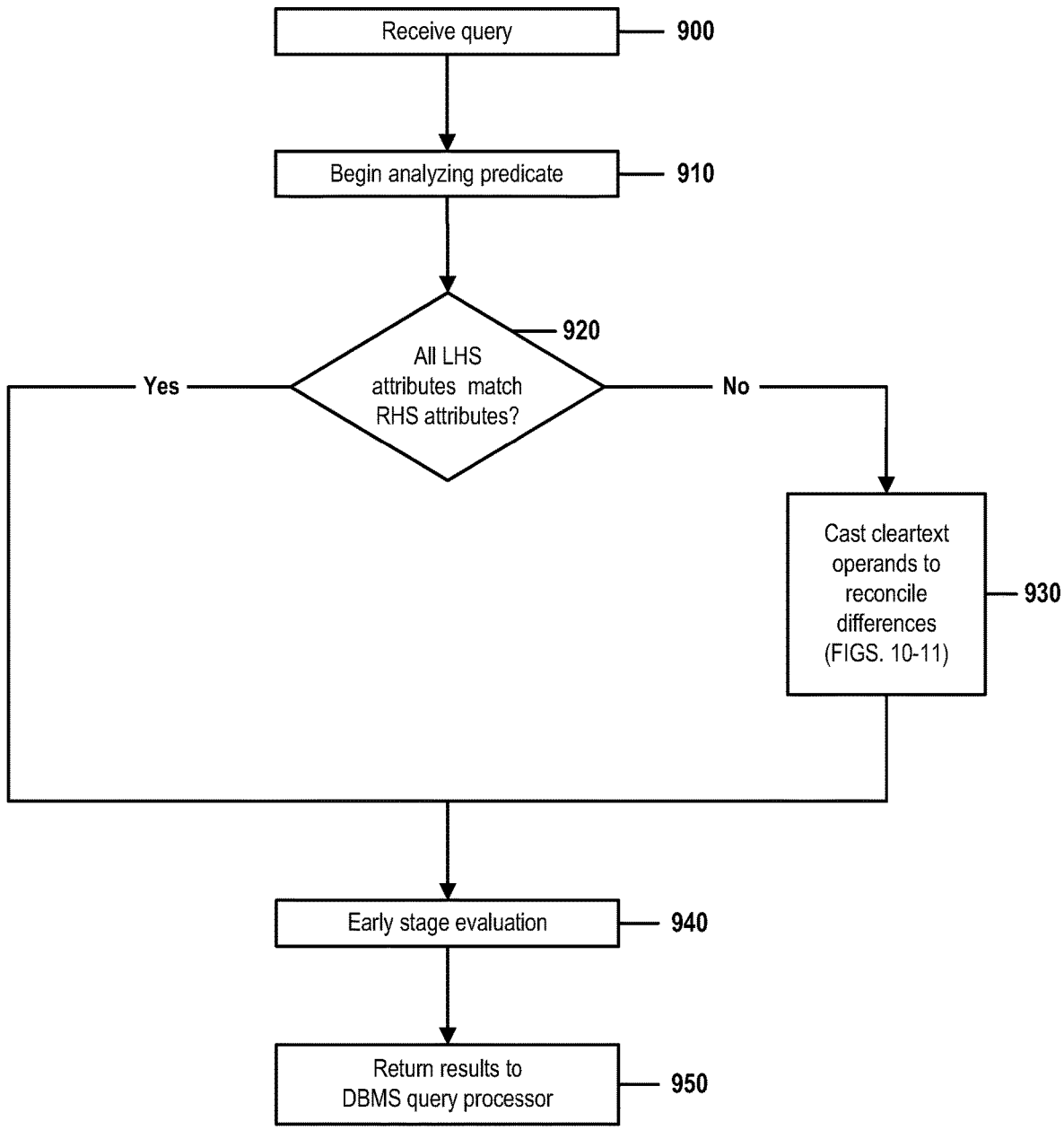
FIG. 9 is a high-level representation of the method for early-stage query evaluation for homomorphic-encrypted databases, in accordance with embodiments of the present invention.

FIG. 9 is a high-level representation of the method for early-stage predicate evaluation for homomorphic-encrypted databases. FIG. 9 contains steps 900-950, which may be implemented on platforms similar to shown in FIGS. 1-4.

Figure 10:
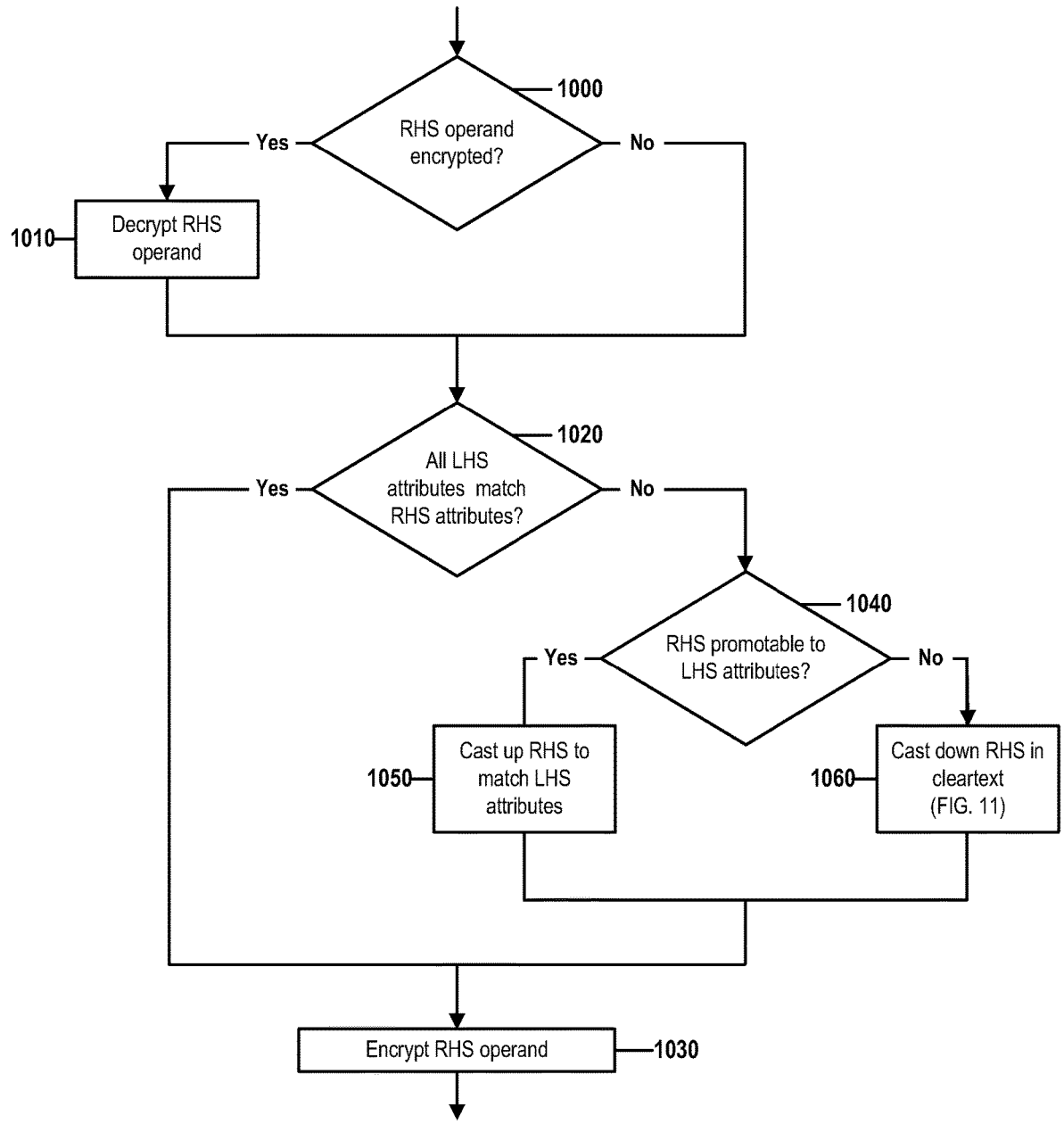
FIG. 10 is a flow chart that shows details of FIG. 9, step 930, which reconciles attribute differences between plaintext LHS and RHS predicate operands of a received query.
Figure 11:
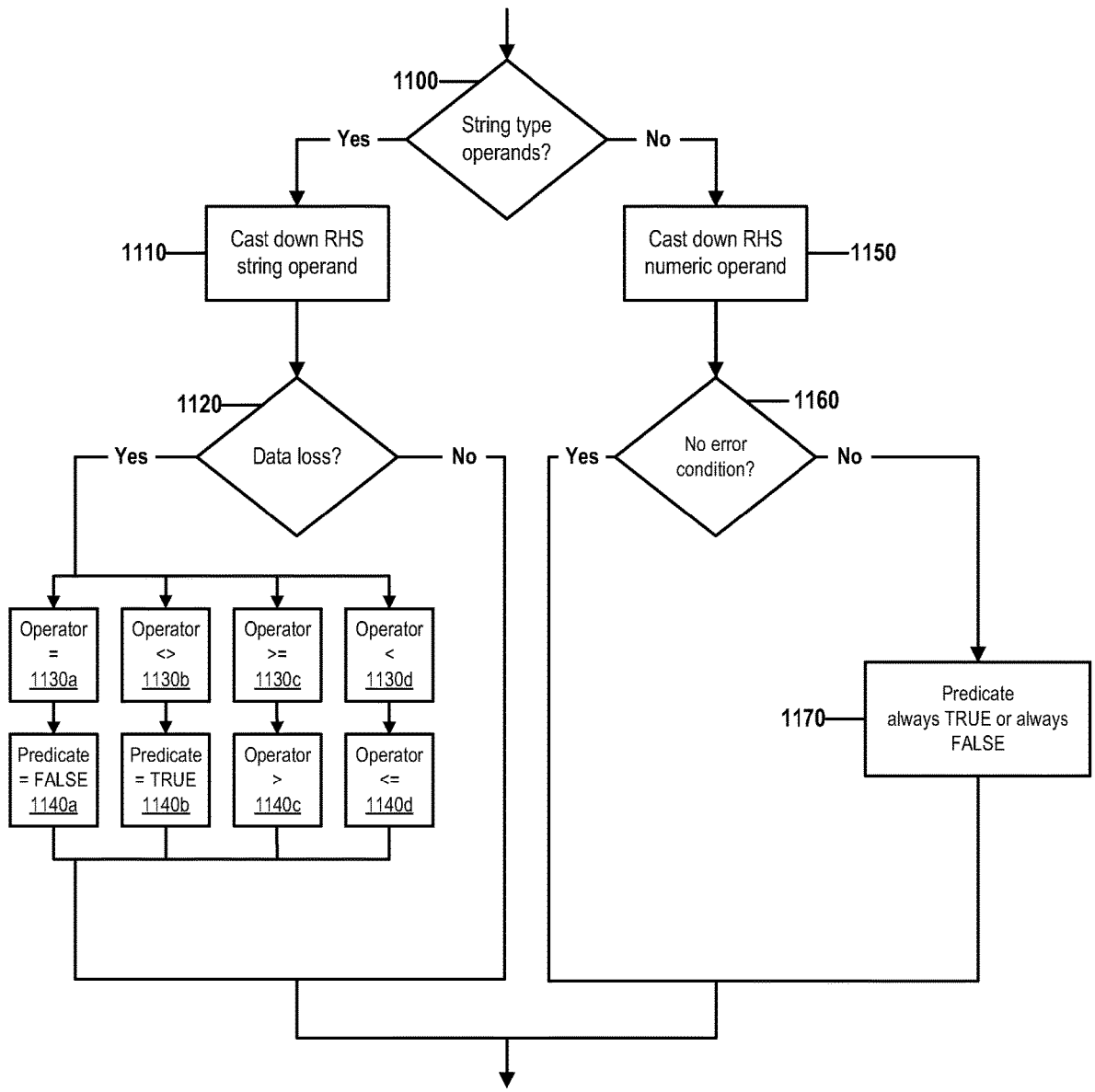
FIG. 11 is a flow chart that shows details of FIG. 10, step 1060, which casts down a plaintext RHS operand in order to reconcile attributes of the RHS operand with those of plaintext values encoded into the encrypted column contents of the database table identified by the LHS operand.

In step 900, query processor 420 of DBMS 400 receives a database query 410, which contains at least one predicate that references data stored in homomorphic-encrypted database 440. Although embodiments of the present invention are not limited to databases encrypted with any particular type of encryption technology, the exemplary database 440 described in FIGS. 9-11 is deemed for illustrative purposes to encrypted with a homomorphic encryption algorithm.

Homomorphic encryption is a technology that allows computations performed on encrypted ciphertext to produce encrypted results that, when decrypted, match the result of the computations as if they had been performed on unencrypted plaintext. The purpose of homomorphic encryption is to allow computation on encrypted data.

In one example, a homomorphic encryption algorithm is used to encode the numbers 100 and 25 into two encrypted data elements, each of which is a 16-byte hexadecimal number. Using a conventional multiplication operator to multiply those two hex numbers produces a product that, when decrypted by the same algorithm, decodes into the plaintext value 2500. In some cases, this procedure only works if the homomorphic algorithm is run with the same key and seed (or initialization vector) during both the encryption and the decryption operations.

In step 910, query processor module 420 forwards a predicate comprised by the received query 410 to the early-stage predicate evaluator module 430 of DBMS 400. In some embodiments, query processor module 420 forwards the entire query 410 to the early-stage predicate evaluator module 430, which then extracts a predicate from the forwarded query 410.

The evaluator module 430 in this step identifies a left-hand-side operand (LHS) of the predicate, a right-hand-side operand (RHS) of the predicate, and an operator (<op>) of the predicate that compares the LHS operand to the RHS operand. The predicate may take any form that may be processed by the particular DBMS 400 and querying technology, but as described above, for FIGS. 9-11 will for pedagogical purposes describe only exemplary predicates in a homomorphic-encryption variation (1a) of the previously discussed form of Eq. (1):

$$<\text{HOM\_col}><\text{op}><\text{exp}> \quad (1a)$$

where LHS <HOM_col> is a homomorphic-encrypted column of database 440, RHS <exp> is a mathematical or data expression that does not identify a column stored in the same table that comprises <HOM_col>, and <op> is a comparison operator selected from the set $\{=, <>, >, <, >=, <=\}$. Embodiments of the present invention may process other predicate forms, including those in which the LHS and RHS operands of Eq. (1a) are interchanged, by methods analogous to those of the examples of FIGS. 9-11.

RHS operand <exp> may be either plaintext or encrypted ciphertext and may be either a local predicate (which does not identify a database column) or a JOIN predicate that does identify a database column.

The homomorphic-encrypted column of the LHS operand will be evaluated as a column of an inner table that is accessed only after RHS operand is evaluated. Because one goal of the present invention is to evaluate predicates without requiring two-stage processing, methods described in this figure exclude predicates that must be evaluated as non-sargable predicates. These include predicates in which a second stage of processing would be necessary to evaluate the LHS operand even if no operands of the predicate had been encrypted.

In step 920, module 430 determines whether all attributes of the LHS operand match corresponding attributes of data elements identified by the RHS operand. These attributes may include any attributes known in the art of database management, including CCSID, data type, data subtype, and data length. Because the LHS operand identifies a homomorphic-encrypted column, module 430 in this step also determines whether the RHS expression is also encrypted, using the same homomorphic algorithm and key and IV.

For example, in a predicate "CustomerResidence_State >"NY"", LHS operand <HOM_col> identifies a database CustomerResidence_State column that contains four-byte CHAR(4) data items encoded with the UTF-8 Unicode character-encoding standard; and RHS operand <exp> is a two-character string literal. Because the lengths of the two operands are not equal, and because the RHS literal value "NY" is not encrypted, module 430 in this step would determine that not all attributes match and perform step 930, which incorporates the methods of FIGS. 10-11. If all attributes do match, the method of FIG. 9 instead proceeds directly to step 940, where the predicate undergoes early-stage evaluation, as described below.

In step 940, evaluator module 430 concludes the evaluation of the predicate as a sargable, early stage operation. This is possible because one of the two following conditions have occurred:

i) Evaluator module 430 in step 920 had determined that the LHS and RHS are homomorphic-encrypted operands that share identical attributes. Given the properties of homomorphic encryption described above, this determination allows the two encrypted operands to be compared without requiring a decryption step. So long as the operands are not of a type that would require a multiple-stage evaluation even if not encrypted, the predicate requires only an early-stage evaluation, in which the two operands can be directly compared byte by byte, as ciphertext, in a single operation; or ii) Evaluator module 430 in step 930 and in FIG. 10 had reconciled differences between the LHS and RHS operands (including cases in which the RHS operand is not encrypted), either returning two encrypted values that share identical attributes, or determining from the result of the reconciliation attempt that the predicate can only resolve to a certain default Boolean value.

In step 950, early-stage predicate evaluator returns the results of its predicate evaluation to DBMS query processor 420. The query processor 420 incorporates these results into the ongoing evaluation of the incoming query 410 received in step 900. Query processor 420 then completes its processing of query 410 through means known in the art, directing other modules of DBMS 400 to perform tasks known in the art to be required to perform the query.

FIG. 10 is a flow chart that shows details of FIG. 9, step 930, which reconciles attribute differences between plaintext LHS and RHS predicate operands of received query 410. FIG. 10 contains steps 1000-1060.

In step 1000, evaluator module 430 determines whether the RHS operand is encrypted. If so, the method of FIG. 10 performs step 1010, in which the RHS operand is decrypted. As described above, evaluator module 430 identifies information required to perform this decryption, such as identifications of the appropriate homomorphic encryption algorithm, key, and seed or IV. This algorithm, key, and seed or IV may not match those used to encrypt the LHS operand column, but they must match the algorithm, key, and seed or IV used to originally encrypt the RHS operand. At the conclusion of steps 1000 and 1010, the RHS operand is known to be an unencrypted plaintext value.

In step 1020, evaluator module 430 determines whether all attributes of the plaintext data items stored in encrypted form in the <HOM_col> column of the LHS operand match corresponding attributes of the plaintext RHS. The evaluator module 430 is able to identify the plaintext LHS attributes through known means because those attributes are identified by the database schema 450 of DBMS 400 or by other components of DBMS 400.

In one example, an embodiment compares a set of attributes of the plaintext data items that have been encrypted and stored in the LHS database column with corresponding attributes of the plaintext RHS operand. If evaluating numeric-type operands, evaluator module 430 might compare attributes that include data type, precision, scale, and byte length of each operand. If evaluating string-type operands, evaluator module 430 might compare attributes that include data type, length, subtype, and CCSID. The exact choice of attributes to compare may be determined by an implementer as a function of technical constraints or of industry standards or conventions.

If evaluator module 430 determines in step 1020 that all plaintext attributes of the LHS operand match corresponding attributes of the plaintext RHS operand, then the method of FIG. 10 concludes with step 1030. Otherwise, the method of FIG. 10 continues with steps 1040-1060.

In step 1040, evaluator module 430, having determined that the plaintext values represented by the LHS and RHS operands do not have identical attributes, determines whether it is possible to promote the RHS operand, without loss of data, to a type and format comprising attributes that match the attributes of plaintext data values represented by the LHS operand. These attributes, depending on implementation details or design constraints, may include attributes like data type, data subtype, length, precision, CCSID, or scale.

For example, if the RHS operand is a two-byte signed integer value and the LHS operand identifies a database table that stores encrypted values of four-byte signed integers, it is possible to cast the RHS operand to the four-byte data type of the LHS operand, since the four-byte LHS data type can represent any signed integer value that can be stored in two bytes.

However, if the RHS operand is a five-byte string value, the evaluator module 430 would determine in step 1040 that it is not possible to promote the RHS-operand value to the LHS-operand's two-byte string format. This is because a two-byte string variable cannot store a five-character string.

In step 1050, having determined that the RHS plaintext value is promotable to the data format of the plaintext values represented by the ciphertext values stored in the LHS-operand database column, evaluator module 430 casts the RHS value to a data format (including a data type and length) that matches the format of the LHS plaintext.

In step 1060, having determined that the RHS plaintext value is not promotable to the data format of the LHS plaintext values, evaluator module 430 transfers control to the method of FIG. 11, which casts down the RHS value in plaintext such that the predicate may be evaluated through an early stage procedure.

At the conclusion of the affirmative branch of conditional step 1020, or at the conclusion of step 1050 or 1060, one of three conditions will be true: i) the RHS operand will have been converted to a plaintext value with attributes that match those of the plaintext values encoded into the database column identified by the LHS operand; ii) the evaluator module 430 will have determined that the predicate, regardless of the values of retrieved LHS-operand data items, must always evaluate to a TRUE value; or iii) the evaluator module 430 will have determined that the predicate, regardless of the values of retrieved LHS-operand data items, must always evaluate to a FALSE value. In all these cases, evaluator module 430 then encrypts the RHS operand in step 1030 and returns control to step 940 or 950 of FIG. 9.

The RHS operand is encrypted in step 1030 with the same homomorphic algorithm, key, and seed or IV that is used to encrypt the LHS operand. If the RHS operand had originally been encrypted with a different homomorphic algorithm, key, or seed/IV, the new ciphertext value of the RHS operand may not match the original ciphertext value of the RHS operand. However, at the conclusion of step 1030 (in all cases except those where evaluator module 430 has already determined that the predicate can only be TRUE or can only be FALSE), the LHS and RHS operands will have identical attributes and will both consist of ciphertext encrypted with the same homomorphic algorithm, key, and seed or IV.

At the conclusion of the method of FIG. 10, no more than a handful of encryption or decryption operations will have been performed on the predicate operands. The potentially large number of encrypted data elements of RHS-operand database column do not need to be decrypted and, at the conclusion of FIG. 10, the evaluator module 430 returns control to FIG. 9, step 940, where the predicate, if it has not already been determined to be TRUE or FALSE, can be evaluated through an early-stage evaluation procedure that directly compares two homomorphic-encrypted data elements that have identical attributes.

FIG. 11 is a flow chart that shows details of FIG. 10, step 1060, which casts down a plaintext RHS operand in order to reconcile attributes of the RHS operand with those of plaintext values encoded into the encrypted column contents of the database table identified by the LHS operand. FIG. 11 contains steps 1100-1170.

In step 1100, evaluator module 430 determines whether the LHS operand and the RHS operand received from step 1060 of FIG. 10 identify string-type data. As described in FIG. 10, the RHS operand consists of a plaintext expression and the LHS operand identifies a column of an inner database table that contains ciphertext encryptions of plaintext values. The comparison of step 1100 compares the data type of the RHS plaintext expression with the data type of the plaintext values encoded into the LHS column.

If evaluator module 430 determines that the operands contain string-type data, then the method of FIG. 11 continues with steps 1110-1140d. If not, the method of FIG. 11 continues with steps 1150-1170.

In step 1110, evaluator module 430 casts down the RHS string operand to the length, data type, and data subtype of the LHS plaintext string values. In these steps, the RHS-operand string length must be greater than the length of the LHS plaintext format.

The casting down in this step is performed by known means, such as by truncating the RHS such that the length of the RHS operand matches that of the plaintext values represented by the encrypted LHS column.

In step 1120, evaluator module 430 determines whether this truncation results in the loss of data from the RHS plaintext operand. If not, the method of FIG. 11 concludes and the reconciled plaintext RHS operand is returned to the method of FIG. 10, where the operand is encrypted to a format comprising attributes that match those of the encrypted data stored in the LHS column. This encrypted RHS operand may then in FIG. 9 be compared directly to encrypted values retrieved from the table in an early stage predicate evaluation procedure.

If, however, evaluator module 430 determines in step 1120 that the truncation of the RHS operand has resulted in the deletion of non-blank characters, thus resulting in data loss, the evaluator module 430 performs steps of the case statement 1130a-1140d. Here, satisfying any of the conditions 1130a-1130d results in the performance of a corresponding action 1140a-1140d. In these steps, conditions 1130a-1130d are functions of the operator <op> comprised by the predicate currently being evaluated. If none of the conditions identified by conditions 1130a-1130d occur (for example, if the predicate operator <op> is > (greater than)), then the case statement 1130a-1140d performs no action.

Case 1130a/1140a states that if the operator is an equality (=) operator, then the predicate must resolve to a FALSE Boolean value. This occurs because the two operands cannot be equal due to data loss caused by truncation of the RHS operand. When returning control to step 1060 of FIG. 10, and then to step 940 of FIG. 9, this determination allows the predicate to be resolved without further computation, thus ensuring a sargable evaluation procedure. In some embodiments, the FALSE determination of step 1130b would be sufficient to complete the predicate-evaluation procedure.

Case 1130b/1140b states that if the operator is an inequality (<>) operator, then the predicate must resolve to a TRUE Boolean value. This occurs because the two operands, as explained above, cannot be equal. When returning control to step 1060 of FIG. 10 and step 940 of FIG. 9, this determination allows the predicate to be resolved without further computation, thus ensuring a sargable evaluation procedure. In some embodiments, the TRUE determination of step 1140b would be sufficient to complete the predicate-evaluation procedure.

Case 1130c/1140c states that if the operator is a greater-than-or-equal-to (>=) operator, then that operator must be replaced with a greater-than (>) operator. This ensures that further evaluation of the predicate in FIGS. 9 and 10 does not resolve the predicate to a TRUE Boolean value if the truncated RHS operand is equal to the LHS operand. Because the LHS and RHS operands cannot be equal, even if truncating the RHS produces a subset of the original RHS operand that now matches the original LHS operand, the predicate should still resolve to a FALSE Boolean value. For this reason, the equality comparison case is deleted from the predicate operator in this step to avoid a false-positive determination that the original LHS and RHS operands are equal. When returning control to step 1060 of FIG. 10 and then to step 940 of FIG. 9, this determination allows the two format-matched encrypted operands to be directly compared by means of a sargable evaluation procedure.

Similarly, case 1130d/1140d states that if the operator is a less-than (<) operator, then that operator must be replaced with a less-than-or-equal-to (<=) operator. This ensures that further evaluation of the predicate in FIGS. 9 and 10 resolves the predicate to a TRUE Boolean value if the truncated RHS operand is equal to the LHS operand. When returning control to step 1060 of FIG. 10 and then to step 940 of FIG. 9, this determination allows the two format-matched encrypted operands to be directly compared by means of a sargable evaluation procedure.

If the predicate operator <op> is not one of {=, < >, >=, <}, then the method of FIG. 11 returns control to FIG. 10 step 1060.

In step 1150, having determined that the predicate compares a pair of numeric operands, evaluator module 430, through methods and technologies known in the field of database management and computer programming, attempts to cast down the RHS numeric operand to the length, data type, precision, and scale of the plaintext numeric values represented by the encrypted LHS column.

In step 1160, evaluator module 430 determines whether the cast-down attempt of step 1150 failed due to a data overflow, underflow, or precision-loss and may round up and round down the cast operation's input value when loss of precision occurs. During the round-up or round-down, overflow and underflow may also occur. These errors are caused by irreconcilable differences between the formats of the LHS and RHS operands or rounding errors that occur during the casting down. The failures may be determined as functions of the RHS operand's plaintext value and the data type of the LHS column, regardless of individual data values that might be stored in the LHS column.

As used in this document, the term "cast down" refers to a CAST operation that forces a data element from a first data type and length to a second data type and length that is capable of representing a smaller range of values than the first data type. For example, a CHAR(6) string-type variable, which is capable of storing six-character strings, might be cast down to a CHAR(3) string, which is capable of storing strings no longer than three characters. Similarly, an INT numeric type variable, which is capable of storing a four-byte integer value, might be cast down to a SMALLINT numeric type, which can only store integer values that may be represented by two bytes of data. A cast-down function is the opposite of a cast-up operation, as the terms are used in this document. Here, casting up refers to a CAST operation that forces the data type and length of a data element to a type and length that is capable of representing a larger range of values.

For example, if the LHS operand of predicate "HOM_col>34022.3333" identifies a database column defined with a DECIMAL(2,1) data type, an attempt to cast down the RHS operand to match the LHS data type, precision, and scale must fail because the value 34022.3333 cannot be represented as DECIMAL(2,1) type data. In other words, attempts to downcast a RHS operand that has 5 significant digits before the decimal point to a data type that has precision 2 scale 1 fails due to an irreconcilable precision mismatch.

If the cast-down attempt is successful, including the successful roundings during the cast-down, the method of FIG. 11 concludes with step 1160 and the successfully cast-down plaintext numeric RHS operand is returned to step 1060 of FIG. 10. This cast-down RHS can then be encrypted in step 1030 of FIG. 10 and directly compared to the encrypted LHS operand by the method of FIG. 9, requiring only a sargable evaluation procedure.

Even a casting failure or error condition can produce useful information. The precision mismatch may indicate that the predicate must evaluate to a FALSE value because the LHS can never represent a value greater than the RHS. For similar reasons, the predicate "HOM_col<34022.3333" (where HOM_col is of type DECIMAL(2,1)) must always evaluate to a TRUE value and the predicate "HOM_col=34022.3333" must always be FALSE because no DECIMAL(2,1) value can be greater than or equal to the decimal value 34022.3333.

Similarly, if the LHS operand identifies data that has a SMALLINT data type, attempting to downcast the RHS of predicate "HOM_col>=32768.88" (where HOM_col has a SMALLINT data type) produces a data overflow failure because the largest value that may be stored as SMALLINT data is 32767. As in the first example, this predicate will always evaluate to a FALSE value because the LHS can never represent a value greater than or equal to the RHS.

In step 1170, evaluator module 430 determines, as a function of the predicate characteristics described above, that the predicate either must always evaluate to a TRUE value or must always evaluate to a FALSE condition. The method of FIG. 11 then returns to FIG. 10, step 1060, and in some embodiments, the identification of an always-TRUE or an always-FALSE condition is sufficient to complete the predicate-evaluation procedure without requiring further steps.

The embodiments and examples of FIGS. 5-8 and FIGS. 9-11 should not be construed to limit the present invention to databases encrypted with OPE and homomorphic encryption technologies. A significant number of the technical advantages offered by the above embodiments may be realized by analogous embodiments tailored for encryption technologies that are currently in use with commercial database products.

For example, embodiments of the present invention may be adapted to database systems encrypted with the ECB (Electronic CodeBook)) and CBC (Cipher Block Chaining), and other encryption modes of the AES (Advanced Encryption Standard) family encryption standards. These encryption technologies differ from OPE in that they are not order-preserving. That is, they do not allow ciphertext and plaintext to be sorted and ordered into identical sequences by identical operations. They also differ from homomorphic encryption technologies in that they do not allow mathematical and logical operations performed upon encrypted data elements to produce the same results as analogous operations performed upon the plaintext values encoded into the data elements.

However, in other ways, these and other common encryption technologies may accrue at least a subset of benefits from the present invention similar to those provided to DBMS technologies that incorporate OPE-encrypted and homomorphic-encrypted databases.

There may be minor variations in the manner in which the present invention is adapted to these other encryption technologies. For example, because AES ECB, like OPE encryption technology, encrypts and decrypts each block of data independently, making ECB mode compatible with certain embodiments of the present invention. AES CBC encryption, on the other hand, incorporates an algorithm that, when encrypting a sequence of data blocks, determines how to encrypt one block as a function of the results of the previous block's encryption. This property makes it impossible for the present invention to perform the ciphertext casting and truncation operations that provide early-stage evaluation for predicates under AES CBC. Other steps of the present invention, such as those that evaluate predicates in a form comprising a cleartext RHS operand, remain viable for AES CBC-encrypted databases.

Furthermore, if an encryption technology, like AES CBC, is not order-preserving, embodiments of the present invention may be applied only to predicates that contain a limited set of equality-type comparative operators when querying an encrypted database. This limited set of operators may include {=, < >, IN, NOT IN, DISTINCT, NOT DISTINCT}, but does not include {<, <=, >, >=}.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system comprising a processor, a memory coupled to the processor, and a computer-readable hardware storage device coupled to the processor, the storage device containing program code configured to be run by the processor via the memory to implement a method for evaluating sargable data-access requests submitted to an encrypted database, the method comprising:

the system receiving a query that requests data values stored in a single column of the encrypted database,
where the query comprises a logical predicate, a LHS operand, a RHS operand, and a logical operator that compares the LHS operand to the RHS operand,
where the logical predicate comprises the LHS operand,
where the LHS operand identifies the column,
where the RHS operand is an expression, and
where a encryption algorithm used to encrypt the stored data values is an order-preserving symmetric encryption (OPE) algorithm;

the system revising any attributes of the RHS operand as required to ensure that all RHS attributes match all LHS attributes; and the system servicing the query, where the servicing comprises a sargable evaluation of the logical predicate.

2. The system of claim 1, where the revising further comprises:

the system determining that the LHS and RHS operands are string data types and that string length is the only attribute of the RHS operand that does not match a corresponding attribute of the LHS operand; and the system adjusting a length of the RHS operand in order to reconcile the string lengths of the LHS and RHS operands.

3. The system of claim 2, where the adjusting comprises:
the system identifying that the RHS operand is ciphertext generated by applying the OPE algorithm to a local predicate of the query that does not identify a column of the database; and
the system reconciling the string lengths of the LHS and RHS operands by either:
truncating the RHS operand by deleting encrypted blocks, or
padding the RHS operand with encrypted blank characters.

4. The system of claim 3, further comprising:
the system ascertaining that the truncating has altered a plaintext value encoded into the encrypted RHS operand; and
the system, in response to the ascertaining, deeming that the LHS operand must be unequal to the RHS operand.

5. The system of claim 1, where a value of an LHS attribute other than length differs from a value of a corresponding RHS attribute, the method further comprising:
the system, performing any decryption operations necessary to place the RHS operand in plaintext form;
the system revising the RHS attributes as required to match corresponding attributes of the plaintext values encoded into the ciphertext stored in the LHS column; and
the system encrypting the RHS operand with an OPE encryption algorithm, key, and seed identical to the algorithm, key, and seed used to encrypt the plaintext values encoded into the ciphertext stored in the LHS column.

6. The system of claim 5, where the LHS operand and RHS operand are string-type operands, the method further comprising:
the system determining that the revising requires the RHS operand to be cast down;
the system casting down the RHS operand such that all attributes of the RHS operand match corresponding attributes of the plaintext values encoded into the ciphertext stored in the LHS column;
the system determining whether the casting down has altered a value stored in the RHS operand; and
the system, if determining that the casting down has altered the value stored in the RHS operand, deeming that the LHS operand must be unequal to the RHS operand.

7. The system of claim 5, where the LHS operand and RHS operand are numeric-type operands, the method further comprising:
the system determining that the revising requires the RHS operand to be cast down;
the system attempting to cast down the RHS operand such that all attributes of the RHS operand match corresponding attributes of the plaintext values encoded into the ciphertext stored in the LHS column;
the system determining whether the attempting has resulted in a failure selected from the group consisting of: an inability of the casting-down operation to match all RHS attributes to corresponding LHS attributes, a data overflow condition, a data underflow condition, or a data-precision mismatch; and
the system, if determining that the attempting has resulted in the failure, deeming, as a function of a characteristic of the failure, that the predicate either must always evaluate to a TRUE condition, or must always evaluate to a FALSE condition.

8. The system of claim 1, where the RHS attributes and the LHS attributes each comprise: an encryption algorithm, an encryption key, an encryption seed or initialization vector, a data type, and a data length.

9. A method for evaluating sargable data-access requests submitted to an encrypted database, the method comprising:
a database-management receiving a query that requests data values stored in a single column of the encrypted database,
where the query comprises a logical predicate, a LHS operand, a RHS operand, and a logical operator that compares the LHS operand to the RHS operand,
where the lgoical predicate comprises the LHS operand,
where the LHS operand identifies the column,
where the RHS operand is an expression, and where a encryption algorithm used to encrypt the stored data values is an order-preserving symmetric encryption (OPE) algorithm;
the system revising any attributes of the RHS operand as required to ensure that all RHS attributes match all LHS attributes; and
the system servicing the query, where the servicing comprises a sargable evaluation of the logical predicate.

10. The method of claim 9, where the revising further comprises:
the system determining that the LHS and RHS operands are string data types and that string length is the only attribute of the RHS operand that does not match a corresponding attribute of the LHS operand; and
the system adjusting a length of the RHS operand in order to reconcile the string lengths of the LHS and RHS operands.

11. The method of claim 10, where the adjusting comprises:
the system identifying that the RHS operand is ciphertext generated by applying the OPE algorithm to a local predicate of the query that does not identify a column of the database; and
the system reconciling the string lengths of the LHS and RHS operands by either:
truncating the RHS operand by deleting encrypted blocks, or
padding the RHS operand with encrypted blank characters.

12. The method of claim 9, where a value of an LHS attribute other than length differs from a value of a corresponding RHS attribute, the method further comprising:
the system, performing any decryption operations necessary to place the RHS operand in plaintext form;
the system revising the RHS attributes as required to match corresponding attributes of the plaintext values encoded into the ciphertext stored in the LHS column; and
the system encrypting the RHS operand with an OPE encryption algorithm, key, and seed identical to the algorithm, key, and seed used to encrypt the plaintext values encoded into the ciphertext stored in the LHS column.

13. The method of claim 12, where the LHS operand and RHS operand are string-type operands, the method further comprising:
the system determining that the revising requires the RHS operand to be cast down;

the system casting down the RHS operand such that all attributes of the RHS operand match corresponding attributes of the plaintext values encoded into the ciphertext stored in the LHS column;

the system determining whether the casting down has altered a value stored in the RHS operand; and the system, if determining that the casting down has altered the value stored in the RHS operand, deeming that the LHS operand must be unequal to the RHS operand.

14. The method of claim 12, where the LHS operand and RHS operand are numeric-type operands, the method further comprising:

the system determining that the revising requires the RHS operand to be cast down;

the system attempting to cast down the RHS operand such that all attributes of the RHS operand match corresponding attributes of the plaintext values encoded into the ciphertext stored in the LHS column;

the system determining whether the attempting has resulted in a failure selected from the group consisting of: an inability of the casting-down operation to match all RHS attributes to corresponding LHS attributes, a data overflow condition, a data underflow condition, or a data-precision mismatch; and the system, if determining that the attempting has resulted in the failure, deeming, as a function of a characteristic of the failure, that the predicate either must always evaluate to a TRUE condition, or must always evaluate to a FALSE condition.

15. The method of claim 9, further comprising providing at least one support service for at least one of creating, integrating, hosting, maintaining, and deploying computer-readable program code in the computer system, wherein the computer-readable program code in combination with the computer system is configured to implement the receiving, the revising, and the servicing.

16. A computer program product, comprising a computer-readable hardware storage device having a computer-readable program code stored therein, the program code configured to be executed by a database-management system comprising a processor, a memory coupled to the processor, and a computer-readable hardware storage device coupled to the processor, the storage device containing program code configured to be run by the processor via the memory to implement a method for evaluating sargable data-access requests submitted to an encrypted database, the method comprising:

the system receiving a query that requests data values stored in a single column of the encrypted database, where the query comprises a logical predicate, a LHS operand, a RHS operand, and a logical operator that compares the LHS operand to the RHS operand, where the logical predicate comprises the LHS operand, where the LHS operand identifies the column, where the RHS operand is an expression, and where a encryption algorithm used to encrypt the stored data values is an order-preserving symmetric encryption (OPE) algorithm;

the system revising any attributes of the RHS operand as required to ensure that all RHS attributes match all LHS attributes; and the system servicing the query, where the servicing comprises a sargable evaluation of the logical predicate.

17. The computer program product of claim 16, where the revising further comprises:

the system determining that the LHS and RHS operands are string data types and that string length is the only attribute of the RHS operand that does not match a corresponding attribute of the LHS operand; and the system reconciling the string lengths of the LHS and RHS operands by either:

truncating the RHS operand by deleting encrypted blocks, or padding the RHS operand with encrypted blank characters.

18. The computer program product of claim 17, further comprising:

the system ascertaining that the truncating has altered a plaintext value encoded into the encrypted RHS operand; and the system, in response to the ascertaining, deeming that the LHS operand must be unequal to the RHS operand.

19. The computer program product of claim 16, where a value of an LHS attribute other than length differs from a value of a corresponding RHS attribute, the method further comprising:

the system, performing any decryption operations necessary to place the RHS operand in plaintext form;

the system revising the RHS attributes as required to match corresponding attributes of the plaintext values encoded into the ciphertext stored in the LHS column; and the system encrypting the RHS operand with an OPE encryption algorithm, key, and seed identical to the algorithm, key, and seed used to encrypt the plaintext values encoded into the ciphertext stored in the LHS column.

20. The computer program product of claim 19, where the LHS operand and RHS operand are string-type operands, the method further comprising:

the system determining that the revising requires the RHS operand to be cast down;

the system casting down the RHS operand such that all attributes of the RHS operand match corresponding attributes of the plaintext values encoded into the ciphertext stored in the LHS column;

the system determining whether the casting down has altered a value stored in the RHS operand; and the system, if determining that the casting down has altered the value stored in the RHS operand, deeming that the LHS operand must be unequal to the RHS operand.

21. The computer program product of claim 19, where the LHS operand and RHS operand are numeric-type operands, the method further comprising:

the system determining that the revising requires the RHS operand to be cast down;

the system attempting to cast down the RHS operand such that all attributes of the RHS operand match corresponding attributes of the plaintext values encoded into the ciphertext stored in the LHS column;

the system determining whether the attempting has resulted in a failure selected from the group consisting of: an inability of the casting-down operation to match all RHS attributes to corresponding LHS attributes, a data overflow condition, a data underflow condition, or a data-precision mismatch; and the system, if determining that the attempting has resulted in the failure, deeming, as a function of a characteristic of the failure, that the predicate either must always evaluate to a TRUE condition, or must always evaluate to a FALSE condition.

\* \* \* \* \*